US012643534B2

(12) United States Patent
Shimomura et al.

(10) Patent No.: US 12,643,534 B2
(45) Date of Patent: Jun. 2, 2026

(54) PARK ASSIST DEVICE, PARK ASSIST METHOD, AND NON-TRANSITORY STORAGE MEDIUM

(71) Applicant: TOYOTA JIDOSHA KABUSHIKI KAISHA, Toyota (JP)

(72) Inventors: Ichiya Shimomura, Nagoya (JP); Yuki Minase, Toyota (JP); Keisuke Oyama, Nisshin (JP); Motonari Obayashi, Nagakute (JP); Yousuke Hattori, Tokyo (JP); Shinji Kitaura, Tokyo (JP); Riki Egami, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/414,937

(22) Filed: Jan. 17, 2024

(65) Prior Publication Data

US 2024/0246530 A1     Jul. 25, 2024

(30) Foreign Application Priority Data

Jan. 20, 2023   (JP) ................................. 2023-007496

(51) Int. Cl.
B60W 30/06          (2006.01)

(52) U.S. Cl.
CPC ......... B60W 30/06 (2013.01); B60W 2720/10 (2013.01)

(58) Field of Classification Search
CPC .. B60W 30/06; B60W 2720/10; G08G 1/168; B62D 15/0285
See application file for complete search history.

(56) References Cited

U.S. PATENT DOCUMENTS 9,522,661 B2    12/2016  Inoue et al.
9,604,638 B2    3/2017   Kiyokawa et al.
(Continued)

FOREIGN PATENT DOCUMENTS

JP        2012-217000 A      11/2012
JP        2016-192772 A      11/2016
(Continued)

OTHER PUBLICATIONS

Houben, Sebastian, et al. "On-vehicle video-based parking lot recognition with fisheye optics." 16th International IEEE Conference on Intelligent Transportation Systems (ITSC 2013). IEEE, 2013. (Year: 2013).*
(Continued)

*Primary Examiner* — Russell Frejd
*Assistant Examiner* — Ana D Thomas
(74) *Attorney, Agent, or Firm* — Sughrue Mion, PLLC

(57)          ABSTRACT

A park assist device includes: a surroundings information sensor configured to acquire information on an object and an indication that are present around a subject vehicle; and an electronic control unit configured to when a request to start automatic parking control is detected while the subject vehicle is traveling, perform a search process for searching for a parking spot based on the information acquired by the surroundings information sensor, when the parking spot is detected, perform a reception process for receiving a choice as to whether to park the subject vehicle in the detected parking spot, and when a choice to park the subject vehicle in the detected parking spot is received, perform a parking process for controlling movement and operation of the subject vehicle in such a manner that the subject vehicle is parked in the detected parking spot.

8 Claims, 13 Drawing Sheets

(56) References Cited

U.S. PATENT DOCUMENTS

| | | | |
|---|---|---|---|
| 9,738,276 B2 | 8/2017 | Kiyokawa et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,239,520 B2 | 3/2019 | Tomozawa et al. | |
| 10,377,416 B2 | 8/2019 | Fukukawa et al. | |
| 2018/0105167 A1* | 4/2018 | Kim | B60W 30/06 |
| 2018/0178724 A1* | 6/2018 | Hatakeyama | H04N 5/265 |
| 2018/0186407 A1* | 7/2018 | Kim | B60W 10/18 |
| 2018/0286240 A1* | 10/2018 | Harai | G08G 1/146 |
| 2020/0079359 A1* | 3/2020 | Tsujino | B60W 30/06 |
| 2021/0009110 A1* | 1/2021 | Jeong | G06V 20/584 |
| 2021/0107564 A1 | 4/2021 | Minase et al. | |
| 2021/0303881 A1 | 9/2021 | Hara et al. | |
| 2022/0340127 A1* | 10/2022 | Gao | G06V 10/82 |
| 2023/0249677 A1* | 8/2023 | Mizoguchi | B62D 15/0285 |
| | | | 701/25 |

FOREIGN PATENT DOCUMENTS

| | | |
|---|---|---|
| JP | 2018-107754 A | 7/2018 |
| JP | 2021-062679 A | 4/2021 |

OTHER PUBLICATIONS

Houben, Sebastian, et al. "On-vehicle video-based parking lot recognition with fisheye optics." 16th International IEEE Conference on Intelligent Transportation Systems (ITSC 2013). IEEE, 2013. (Year: 2013) (Year: 2013).*

* cited by examiner

Figure 1:
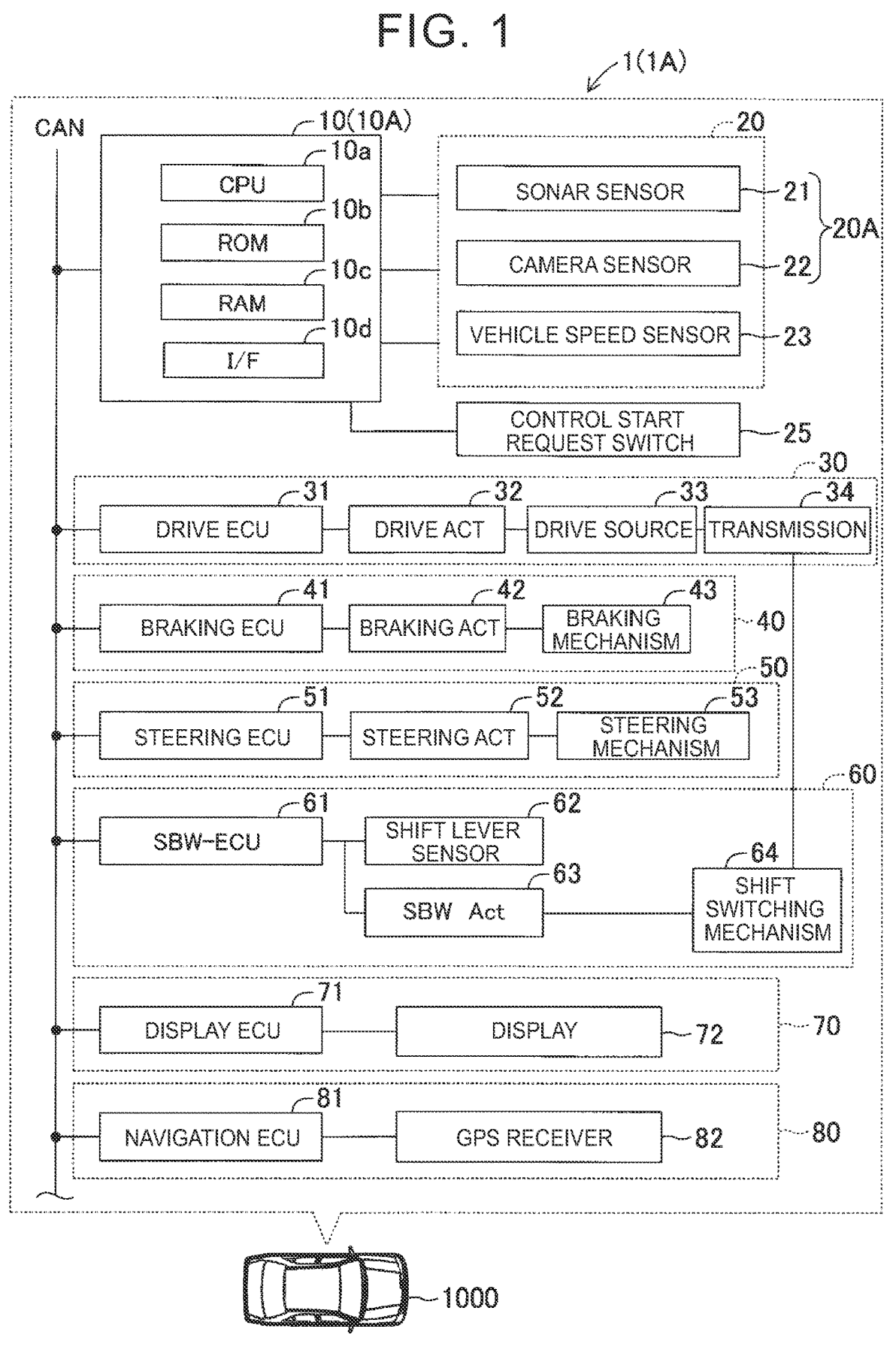

CAN     10(10A)     20

| | 10a |
| CPU | |

| | 10b |
| ROM | |

| | 10c |
| RAM | |

| | 10d |
| I/F | |

| SONAR SENSOR | 21 |
| CAMERA SENSOR | 22 |
| VEHICLE SPEED SENSOR | 23 |

20A

| CONTROL START REQUEST SWITCH | 25 |

30

| DRIVE ECU 31 | DRIVE ACT 32 | DRIVE SOURCE 33 | TRANSMISSION 34 |

| BRAKING ECU 41 | BRAKING ACT 42 | BRAKING MECHANISM 43 | 40 |

50

| STEERING ECU 51 | STEERING ACT 52 | STEERING MECHANISM 53 |

60

| SBW-ECU 61 | SHIFT LEVER SENSOR 62 | |
| | SBW Act 63 | SHIFT SWITCHING MECHANISM 64 |

| DISPLAY ECU 71 | DISPLAY 72 | 70 |

| NAVIGATION ECU 81 | GPS RECEIVER 82 | 80 |

1000

L13   1000   L12   2011   L11

PARK ASSIST DEVICE, PARK ASSIST METHOD, AND NON-TRANSITORY STORAGE MEDIUM

CROSS-REFERENCE TO RELATED APPLICATION

This application claims priority to Japanese Patent Application No. 2023-007496 filed on Jan. 20, 2023, incorporated herein by reference in its entirety.

BACKGROUND

1. Technical Field

The present disclosure relates to a park assist device, a park assist method, and a non-transitory storage media.

2. Description of Related Art

A park assist device is configured to perform automatic parking control for performing at least part or all of driving maneuvers of a subject vehicle so that the subject vehicle is parked at a parking spot. Regarding such a park assist device, the standards ISO 20900 (partially automated parking systems (PAPS)) and ISO 16787 (assisted parking systems (APS)) define vehicle control related to parking of vehicles.

The park assist device described in Japanese Unexamined Patent Application Publication No. 2021-62679 (JP 2021-62679 A) sets a travel boundary line when performing automatic parking control, and performs maneuvers related to parking of a subject vehicle so that the subject vehicle moves in an area within the travel boundary line.

SUMMARY

When starting the automatic parking control by the park assist device in the related art, a driver of the subject vehicle stops the subject vehicle at a position near a parking spot, such as a position next to the parking spot. With the subject vehicle stopped, the driver (or passenger) of the subject vehicle operates a start request switch for inputting a request to start the automatic parking control. The park assist device starts the automatic parking control when it detects the request to start the automatic parking control and also the stop position of the subject vehicle is a position (proper position) suitable to start a parking process for controlling the movement and operation of the subject vehicle to the parking spot.

However, a driver unfamiliar with the automatic parking control may press the start request switch without stopping the subject vehicle. In that case, the automatic parking control is not started. The automatic parking control is not started even if the foot is slightly off an accelerator pedal when the start request switch is pressed. As described above, the conventional park assist device does not provide enough convenience in terms of starting the automatic parking control.

The present disclosure provides a park assist device, a park assist method, and a non-transitory storage medium.

A park assist device according to a first aspect of the present disclosure includes: a surroundings information sensor configured to acquire information on an object and an indication that are present around a subject vehicle; and a control device configured to perform automatic parking control for controlling the subject vehicle in such a manner that the subject vehicle is parked in the parking spot.

The park assist device according to the first aspect of the present disclosure includes: a surroundings information sensor configured to acquire information on an object and an indication that are present around a subject vehicle; and an electronic control unit. The electronic control unit is configured to: when a request to start automatic parking control is detected while the subject vehicle is traveling, perform a search process for searching for a parking spot based on the information acquired by the surroundings information sensor, the automatic parking control being control for parking the subject vehicle in the parking spot; when the parking spot is detected, perform a reception process for receiving a choice as to whether to park the subject vehicle in the detected parking spot; and when a choice to park the subject vehicle in the detected parking spot is received, perform a parking process for controlling movement and operation of the subject vehicle in such a manner that the subject vehicle is parked in the detected parking spot.

According to the park assist device of the present disclosure, when the control device detects the request to start the automatic parking control while the subject vehicle is traveling, the search process for searching for a parking spot is automatically performed. When the parking spot is detected by the search process and the control device receives the choice to park the subject vehicle in the detected parking spot, the parking process for parking the subject vehicle in the detected parking spot is performed. As described above, the automatic parking control can be started even when the control device detects the request to start the automatic parking control while the subject vehicle is not stopped. This can improve convenience in performing the automatic parking control by the park assist device.

In one aspect of the park assist device according to the present disclosure, the electronic control unit may be configured to cause the subject vehicle to autonomously drive at a preset speed during the search process.

According to this configuration, setting the speed to a predetermined low speed can enhance the safety of the subject vehicle during the search process.

In another aspect of the park assist device according to the present disclosure, the electronic control unit may be configured to resume the search process when a choice not to park the subject vehicle in the detected parking spot is received.

According to this configuration, when an occupant of the subject vehicle does not have an intention to park the subject vehicle in the parking spot detected by the search process, it is possible to search for another parking spot by resuming the search process.

In still another aspect of the park assist device according to the present disclosure, the electronic control unit may be configured to: when the parking spot is detected by the search process, control the subject vehicle in such a manner that the subject vehicle stops at a predetermined position within an area around the detected parking spot; and perform the reception process with the subject vehicle stopped at the predetermined position.

According to this configuration, since the subject vehicle stops at the predetermined position within the area around the parking spot detected by the search process, the occupant of the subject vehicle can see the size of the detected parking spot etc. from the stop position of the subject vehicle. It is therefore possible to determine whether to park the subject vehicle in the detected parking spot while looking at the parking spot.

The predetermined position is preferably a proper position where the surroundings information sensor can recognize the parking spot and that is suitable to start the parking process for controlling the movement and operation of the subject vehicle in such a manner that the subject vehicle is parked in the detected parking spot. According to this configuration, the subject vehicle is automatically guided to the proper position for performing the parking process and stops at that position. Therefore, the driver of the subject vehicle does not need to maneuver the subject vehicle to move the subject vehicle to the proper position. This can reduce the burden of driving on the driver of the subject vehicle that is caused by the driver of the subject vehicle having to search for the proper position for parking the subject vehicle in the parking spot.

In yet another aspect of the park assist device according to the present disclosure, the electronic control unit may be configured to end the search process when a preset amount of time has elapsed since start of the search process without detection of the parking spot, or when the subject vehicle has traveled a preset distance since the start of the search process without detection of the parking spot.

This can prevent wasting time due to continuing the search process even though there is no parking spot.

In a further aspect of the park assist device according to the present disclosure, the park assist device may further include an input device configured to input the choice as to whether to park the subject vehicle in the parking spot detected by the search process, and the electronic control unit may be configured to receive the choice input from the input device in the reception process.

According to this configuration, when the parking spot is detected by the search process, the occupant of the subject vehicle uses the input device to input the choice as to whether to park the subject vehicle in the detected parking spot. The control device of the park assist device thus receives the choice. The control device can therefore perform a process according to the choice.

The input device preferably has a notification function to notify information prompting to choose whether to park the subject vehicle in the detected parking spot, and an input function to input the choice as to whether to park the subject vehicle in the detected parking spot. For example, the input device can be a touch panel display mounted on the subject vehicle and a display device having a display electronic control unit (ECU) configured to control an image that is displayed on the display.

The control device of the park assist device according to the present disclosure may be configured to: when the request to start the automatic parking control is detected while the subject vehicle is traveling, perform the search process for searching for a parking spot based on the information acquired by the surroundings information sensor while causing the subject vehicle to autonomously drive at the preset speed; and when the parking sport is detected by the search process, start, without stopping the subject vehicle, the parking process for controlling the movement and operation of the subject vehicle in such a manner that the subject vehicle is parked in the detected parking spot.

According to this configuration, when the parking spot is detected by the search process, the process that is performed by the control device seamlessly shifts from the search process to the parking process without the subject vehicle stopping. Therefore, the subject vehicle can be quickly parked in the parking spot.

The control device of the park assist device according to the present disclosure may be configured to: when the request to start the automatic parking control is detected while the subject vehicle is traveling, perform the search process for searching for a parking spot based on the information acquired by the surroundings information sensor while causing the subject vehicle to autonomously drive at the preset speed; and when the parking sport is detected by the search process, perform a vehicle stop process for stopping the subject vehicle at the proper position, the proper position being a position that is located within an area around the detected parking sport and that is suitable to start the parking process for controlling the movement and operation of the subject vehicle in such a manner that the subject vehicle is parked in the detected parking spot.

A park assist method according to a second aspect of the present disclosure includes: acquiring information on an object and an indication that are present around a subject vehicle; when a request to start automatic parking control is detected while the subject vehicle is traveling, searching for a parking spot based on the acquired information, the automatic parking control being control for parking the subject vehicle in the parking spot; when the parking spot is detected, receiving a choice as to whether to park the subject vehicle in the detected parking spot; and when a choice to park the subject vehicle in the detected parking spot is received, controlling movement and operation of the subject vehicle in such a manner that the subject vehicle is parked in the detected parking spot.

A non-transitory storage medium according to a third aspect of the present disclosure is a non-transitory storage medium storing instructions that are executable by one or more processors and that cause the one or more processors to perform functions. The functions include: acquiring information on an object and an indication that are present around a subject vehicle; when a request to start automatic parking control is detected while the subject vehicle is traveling, searching for a parking spot based on the acquired information, the automatic parking control being control for parking the subject vehicle in the parking spot; when the parking spot is detected, receiving a choice as to whether to park the subject vehicle in the detected parking spot; and when a choice to park the subject vehicle in the detected parking spot is received, controlling movement and operation of the subject vehicle in such a manner that the subject vehicle is parked in the detected parking spot.

According to this configuration, the subject vehicle automatically moves to a proper position for starting a parking process for parking the subject vehicle in the parking spot, and the subject vehicle automatically stops at the proper position. Therefore, there is no need for an operator of the subject vehicle to search for the proper position. This can reduce the burden of driving on the driver of the subject vehicle that is caused by the driver of the subject vehicle having to search for the proper position for parking the subject vehicle in the parking spot.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a block diagram of a park assist device according to a first embodiment of the present disclosure;

DETAILED DESCRIPTION OF EMBODIMENTS

First Embodiment

Figure 2:
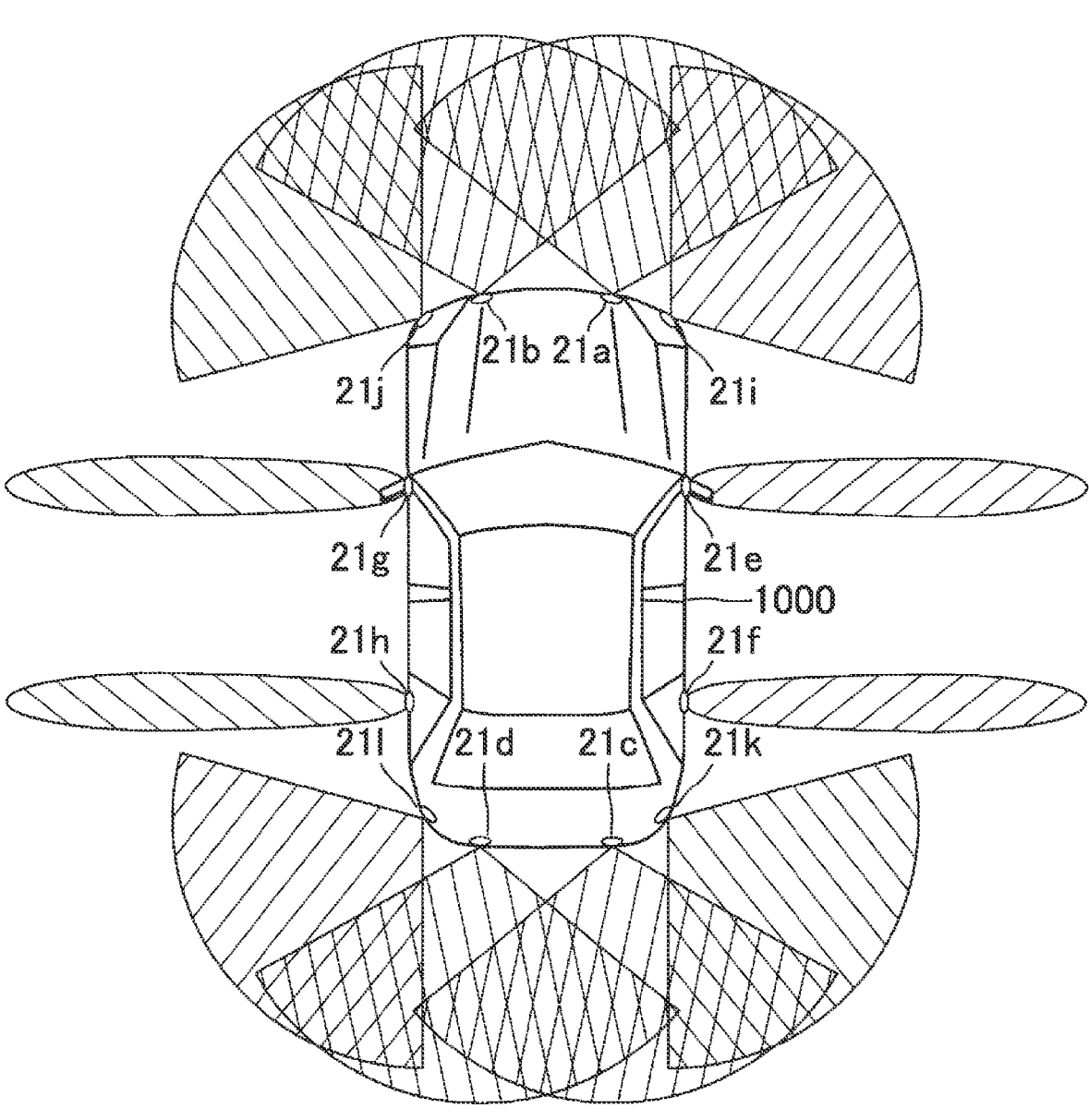
FIG. 2 shows an example of installation positions of sonar sensors.

As shown in FIG. 1, a park assist device 1 according to an embodiment of the present disclosure is mounted on a vehicle 1000 having an autonomous driving function. Hereinafter, the vehicle 1000 is sometimes referred to as "subject vehicle." That is, the park assist device 1 is mounted on the subject vehicle.

The park assist device 1 includes a park assist ECU 10, in-vehicle sensors 20, a control start request switch 25, a drive device 30, a braking device 40, a steering device 50, a shift switching device 60, a display device 70, and a navigation device 80. The term "ECU" is an abbreviation for electronic control unit.

The park assist ECU 10 includes, as its main component, a microcomputer that includes a central processing unit (CPU) 10a, a read-only memory (ROM) 10b, a random access memory (RAM) 10c, and an interface 10d. The park assist ECU 10 is a control device configured to perform various types of control including automatic parking control by the CPU 10a executing instructions, programs, or routines stored in the ROM 10b. In the present embodiment, the automatic parking control is control in which the subject vehicle is parked at a parking spot by the park assist device 1 operating at least one of the following devices of the subject vehicle when the park assist ECU 10 detects a request to start the automatic parking control: the drive device 30, the braking device 40, and the steering device 50. Accordingly, the automatic parking control may be control in which the park assist device 1 controls all of the drive device 30, the braking device 40, and the steering device 50, or control in which the park assist device 1 controls only the steering device 50. The automatic parking control is control including a search process and a parking process, which will be described later.

The park assist ECU 10 may be composed of a plurality of ECUs. The park assist ECU 10 is connected to a plurality of other ECUs via a controller area network (CAN). For example, as shown in FIG. 1, the park assist ECU 10 is connected to a drive ECU 31, a braking ECU 41, a steering ECU 51, a steer-by-wire (SBW)-ECU 61, a display ECU 71, and a navigation ECU 81, and can transfer necessary information to and from the ECUs to which the park assist ECU 10 is connected.

The in-vehicle sensors 20 include surroundings information sensors 20A that acquire information on objects or indications that are present around the subject vehicle. For example, the in-vehicle sensors 20 include a sonar sensor 21 and a camera sensor 22 as the surroundings information sensors 20A.

The sonar sensor 21 intermittently emits ultrasonic waves in an area around the subject vehicle, and receives ultrasonic waves (reflected waves) reflected from a three-dimensional object (object). The sonar sensor 21 acquires the distance between the subject vehicle and the object, the relative positional relationship between the subject vehicle and the object, etc. based on the time from transmission of an ultrasonic wave to reception of a reflected wave. The sonar sensor 21 sends information indicating the acquired distance and positional relationship to the park assist ECU 10.

In the present embodiment, a plurality of sonar sensors 21 is mounted on the subject vehicle. The sonar sensors 21 are mounted on the subject vehicle so that they can emit ultrasonic waves substantially all around the subject vehicle. For example, as shown in FIG. 2, the sonar sensors 21 may include front sonar sensors 21a, 21b, rear sonar sensors 21c, 21d, right sonar sensors 21e, 21f, left sonar sensors 21g, 21h, a right front sonar sensor 21i, a left front sonar sensor 21j, a right rear sonar sensor 21k, and a left rear sonar sensor 21l. The front sonar sensors 21a, 21b emit ultrasonic waves forward from rightward and leftward portions of the front end of the subject vehicle, respectively. The rear sonar sensors 21c, 21d emit ultrasonic waves rearward from rightward and leftward portions of the rear end of the subject vehicle, respectively. The right sonar sensors 21e, 21f emit ultrasonic waves rightward from forward and rearward portions of the right end of the subject vehicle, respectively. The left sonar sensors 21g, 21h emit ultrasonic waves leftward from forward and rearward portions of the left end of the subject vehicle, respectively. The right front sonar sensor 21*i* emits ultrasonic waves obliquely forward to the right from the front right end of the subject vehicle. The left front sonar sensor 21*j* emits ultrasonic waves obliquely forward to the left from the front left end of the subject vehicle. The right rear sonar sensor 21*k* emits ultrasonic waves obliquely rearward to the right from the rear right end of the subject vehicle. The left rear sonar sensor 21*l* emits ultrasonic waves obliquely rearward to the left from the rear left end of the subject vehicle.

The camera sensor 22 includes camera devices and an image analysis device. The camera devices are, for example, digital cameras containing an imaging element such as a charge coupled device (CCD) or a complementary metal oxide semiconductor (CMOS) image sensor (CIS). Each camera device acquires image data by capturing an image of an area around the subject vehicle at a predetermined frame rate. Each camera device sends the image data to the image analysis device. The image analysis device analyzes the acquired image data to acquire information on objects and indications that are present around the subject vehicle from the image. For example, the image analysis device recognizes the shape and color of a wall or fence of a parking spot and parking markings on a road surface, and sends information indicating the recognition results to the park assist ECU 10 together with the image data.

Figure 3:
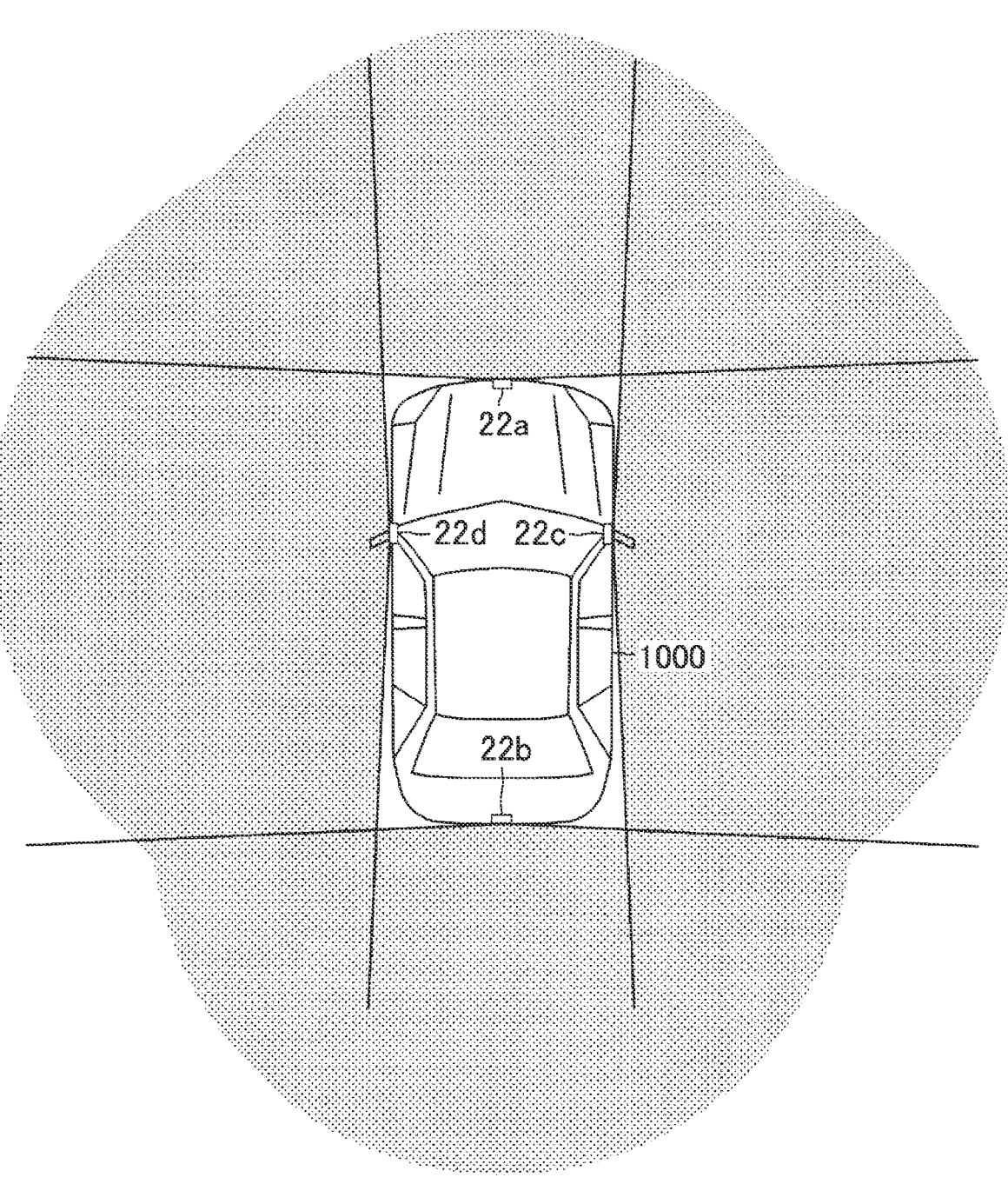
FIG. 3 shows an example of installation positions of camera sensors.

The camera sensor 22 includes a plurality of camera devices to capture images of the entire surroundings of the subject vehicle. For example, as shown in FIG. 3, the camera devices include a front camera device 22*a*, a rear camera device 22*b*, a right side camera device 22*c*, and a left side camera device 22*d*. The front camera device 22*a* captures an image of an area ahead of the subject vehicle. The rear camera device 22*b* captures an image of an area behind the subject vehicle. The right side camera device 22*c* captures an image of an area to the right of the subject vehicle. The left side camera device 22*d* captures an image of an area to the left of the subject vehicle. The camera devices may include infrared camera devices to capture images of the surroundings of the subject vehicle even at night.

The in-vehicle sensors 20 may include radar sensors as the surroundings information sensors 20A. The radar sensors are configured to detect an object that is present around the subject vehicle by using radio waves in a millimeter wave band. In this case, the radar sensors preferably include a front radar sensor that emits radio waves forward of the subject vehicle, a rear radar sensor that emits radio waves rearward of the subject vehicle, a right side radar sensor that emits radio waves to the right of the subject vehicle, and a left side radar sensor that emits radio waves to the left of the subject vehicle.

The in-vehicle sensors 20 further include a vehicle speed sensor 23. The vehicle speed sensor 23 detects the travel speed of the subject vehicle and outputs a signal indicating the detected travel speed to the park assist ECU 10. The vehicle speed sensor 23 may be a wheel speed sensor that detects the rotational speed of a wheel of the subject vehicle.

The in-vehicle sensors 20 may include sensors other than those described above. For example, the in-vehicle sensors 20 may include a shift lever sensor 62 that will be described later, a yaw rate sensor, an acceleration sensor, a driver monitor sensor, a steering torque sensor, an accelerator pedal stroke sensor, and a brake pedal stroke sensor.

The control start request switch 25 is an operation device for requesting to start the automatic parking control. The control start request switch 25 is installed at a position in a vehicle cabin of the subject vehicle where the driver can easily operate the control start request switch 25. The control start request switch 25 includes, for example, a push button type normally open switch device. The park assist ECU 10 is electrically connected to the control start request switch 25 and detects the ON and OFF states of the control start request switch 25.

The drive device 30 generates a driving force and applies the driving force to drive wheels of the subject vehicle. The drive device 30 includes the drive ECU 31, a drive actuator 32, a drive source 33, a transmission 34, and a driving force transmission mechanism, not shown, that transmits the driving force to the drive wheels. The drive ECU 31 is electrically connected to the drive actuator 32 to control the operation of the drive actuator 32. The drive actuator 32 is configured to adjust the driving force of the drive source 33. For example, when the drive source 33 is an internal combustion engine, the drive actuator 32 is a throttle valve configured to adjust the amount of fuel to be supplied to the internal combustion engine and an opening degree adjustment mechanism configured to adjust the opening degree of the throttle valve.

The drive ECU 31 controls the operation of the drive actuator 32 to control a driving force to be generated by the drive source 33. The driving force generated by the drive source 33 is transmitted to the drive wheels of the subject vehicle via the transmission 34 and the driving force transmission mechanism. The drive ECU 31 can thus control the driving force of the subject vehicle by controlling the drive actuator 32. The park assist ECU 10 sends a drive control signal including information indicating a target driving force to the drive ECU 31 during the automatic parking control. The park assist ECU 10 can thus control the drive actuator 32 via the drive ECU 31 so that the driving force matches the target driving force. The drive device 30 can also generate a driving force when the driver operates an accelerator pedal of the subject vehicle.

When the drive source 33 is an internal combustion engine, the drive ECU 31 controls a driving force to be generated by the internal combustion engine. When the subject vehicle is a hybrid electric vehicle (HEV), the drive ECU 31 controls a driving force to be generated by either or both of an internal combustion engine and an electric motor that serve as the drive source 33. When the subject vehicle is a battery electric vehicle (BEV), the drive ECU 31 controls a driving force to be generated by an electric motor that serves as the drive source 33.

The braking device 40 applies a braking force to the wheels of the subject vehicle. The braking device 40 includes the braking ECU 41, a braking actuator 42, and a braking mechanism 43. The braking ECU 41 is electrically connected to the braking actuator 42 to control the operation of the braking actuator 42. The braking actuator 42 includes a known hydraulic circuit, and includes a reservoir, an oil pump, and various valve devices, which are not shown. The braking mechanism 43 includes brake discs, calipers, pistons, and brake pads, and generates a friction braking force when the brake pads are pressed against the brake discs by hydraulic pressures (i.e. braking pressures) supplied from the braking actuator 42. The subject vehicle is braked by the friction braking force generated by the braking mechanism 43.

The braking actuator 42 adjusts the hydraulic pressures (braking pressures) to be supplied to the braking mechanism 43 according to an instruction from the braking ECU 41. The friction braking force generated by the braking mechanism 43 varies according to the braking pressures. The braking ECU 41 can thus control the braking force for the subject vehicle by controlling the braking actuator 42. The park assist ECU 10 sends a braking control signal including information indicating a target braking force to the braking ECU 41 during the automatic parking control. The park assist ECU 10 can thus control the braking actuator 42 via the braking ECU 41 so that the braking force matches the target braking force. The braking device 40 can also apply a braking force to the wheels of the subject vehicle when the driver operates a brake pedal of the subject vehicle.

The steering device 50 is a device that steers steered wheels of the subject vehicle. The steering device 50 includes the steering ECU 51, a steering actuator 52, and a steering mechanism 53. The steering ECU 51 is electrically connected to the steering actuator 52 to control the operation of the steering actuator 52. The steering mechanism 53 includes a steering wheel, a steering shaft, a steering gear box, and tie rods. The steering mechanism 53 is configured to steer the steered wheels through an operation to rotate the steering wheel. The steering actuator 52 is, for example, an electric motor, and is connected to the steering mechanism 53 to apply power for steering the steered wheels to the steering mechanism 53. The steering actuator 52 may also be configured to generate a steering assist force that assists the driver in operating the steering wheel. The steering ECU 51 controls the operation of the steering mechanism 53 by controlling the operation of the steering actuator 52. The steering ECU 51 can therefore control the steering angle of the steered wheels of the subject vehicle by controlling the steering actuator 52. The park assist ECU 10 sends a steering control signal including information indicating a target steering angle to the steering ECU 51 during the automatic parking control. The park assist ECU 10 can thus control the steering actuator 52 via the steering ECU 51 so that the steering angle of the steered wheels matches the target steering angle.

The shift switching device 60 switches a shift position (shift speed) of the transmission 34. In this example, the shift position includes at least a parking position, a neutral position, a forward position, and a reverse position. When the shift position is the parking position, the shift switching device 60 mechanically locks the wheels so that no driving force is transmitted to the drive wheels and the wheels are not allowed to rotate. Specifically, when the shift position is the parking position, an output shaft of the transmission 34 is locked so as not to be rotated. Such a state is also referred to as a "parking lock (P lock) state." When the shift position is the neutral position, the shift switching device 60 does not transmit a driving force to the drive wheels. However, when the shift position is the neutral position, the shift switching device 60 does not mechanically lock the wheels. When the shift position is the forward position, the shift switching device 60 transmits to the drive wheels a driving force that moves the vehicle forward. When the shift position is the reverse position, the shift switching device 60 transmits to the drive wheels a driving force that moves the vehicle backward.

The shift switching device 60 includes the SBW-ECU 61, the shift lever sensor 62, an SBW actuator 63, and a shift switching mechanism 64. The term "SBW" is an abbreviation for shift-by-wire. The SBW-ECU 61 is connected to the shift lever sensor 62 and the SBW actuator 63. The shift lever sensor 62 detects the shift position corresponding to an operation of the shift lever. The shift lever is provided so that an operation of the shift lever corresponding to each shift position can be performed. The shift lever is operated by the driver of the subject vehicle. The SBW-ECU 61 receives the shift position corresponding to an operation of the shift lever from the shift lever sensor 62, and controls the SBW actuator 63 based on the shift position. The SBW actuator 63 actuates the shift switching mechanism 64 according to an instruction from the SBW-ECU 61 to switch the shift position of the transmission 34 to one of a plurality of shift positions (parking position, neutral position, forward position, and reverse position). The park assist ECU 10 sends a shift control signal including information indicating a target shift position to the SBW-ECU 61 during the automatic parking control. The park assist ECU 10 can thus control the SBW actuator 63 via the SBW-ECU 61 so that the shift position matches the target shift position.

The display device 70 includes the display ECU 71 and a touch panel display 72. The display ECU 71 is connected to the display 72 to control the display 72. The display 72 may be a display mounted in an instrument panel located in front of the driver's seat of the subject vehicle. The park assist ECU 10 sends a predetermined display control signal to the display ECU 71. The park assist ECU 10 can thus control the display device 70 so that predetermined image information is displayed on the display 72. The display device 70 has a notification function to notify predetermined information via the display 72. The display device 70 also has an input function as an input device that receives input of predetermined information via the display 72.

The navigation device 80 includes the navigation ECU 81 and a Global Positioning System (GPS) receiver 82. The GPS receiver 82 receives GPS signals for detecting the latitude and longitude of the current location of the subject vehicle. The navigation device 80 also includes a map database storing map information. The navigation ECU 81 identifies the location of the subject vehicle on a map by performing various arithmetic processes based on, for example, the latitude and longitude of the subject vehicle obtained from the GPS signals received by the GPS receiver 82 and the map information. The identified location of the subject vehicle is sent to the park assist ECU 10 and used for the automatic parking control.

Figure 4:
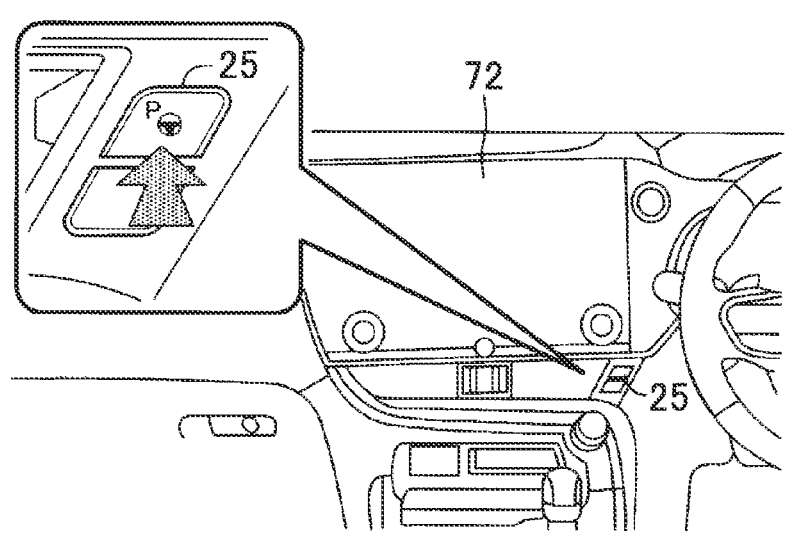
FIG. 4 shows an example of a mounting position of a control start request switch.

The driver of the subject vehicle equipped with the park assist device 1 having the above configuration presses the control start request switch 25 when the driver wants to start the automatic parking control. The conventional park assist device 1 is configured not to allow the automatic parking control to be started when the control start request switch 25 is pressed while the subject vehicle is traveling. On the other hand, the park assist device 1 according to the present embodiment is configured to allow the automatic parking control to be started when the control start request switch 25 is pressed while the subject vehicle is traveling at low speeds. For example, the driver of the subject vehicle can press the control start request switch 25 when the driver is driving the subject vehicle at a low speed in order to find a parking spot to park the subject vehicle after the subject vehicle enters a parking lot where a plurality of vehicles can be parked. For example, as shown in FIG. 4, the control start request switch 25 is mounted at a position below the display 72 embedded in the instrument panel in the vehicle cabin of the subject vehicle.

When the control start request switch 25 is pressed, the park assist ECU 10 detects that the control start request switch 25 is in the ON state. When the park assist ECU 10 detects that the control start request switch 25 is in the ON state, that is, when the park assist ECU 10 detects a request to start the automatic parking control, the park assist ECU 10 starts the automatic parking control. When the automatic parking control is started, the park assist ECU 10 first acquires a current vehicle speed V of the subject vehicle from the vehicle speed sensor 23. Next, the park assist ECU 10 determines whether the current vehicle speed V of the subject vehicle is less than a preset upper limit vehicle speed Vth. The upper limit vehicle speed Vth can be set to, for example, 10 km/h. When the current vehicle speed V of the subject vehicle is less than the upper limit vehicle speed Vth, the park assist ECU 10 determines whether the subject vehicle is not stopped, that is, whether the vehicle speed V of the subject vehicle is not 0 km/h. When the subject vehicle is not stopped, the park assist ECU 10 performs a search process.

In the search process, the park assist ECU 10 controls the drive device 30, the braking device 40, and the steering device 50 of the subject vehicle so that the vehicle speed V of the subject vehicle becomes a preset set vehicle speed Vs and the steering angle θ becomes 0°. As a result, the subject vehicle autonomously drives at the set vehicle speed Vs. The set vehicle speed Vs can be set to, for example, a speed of 5 km/h or more and 10 km/h or less.

Figure 5:
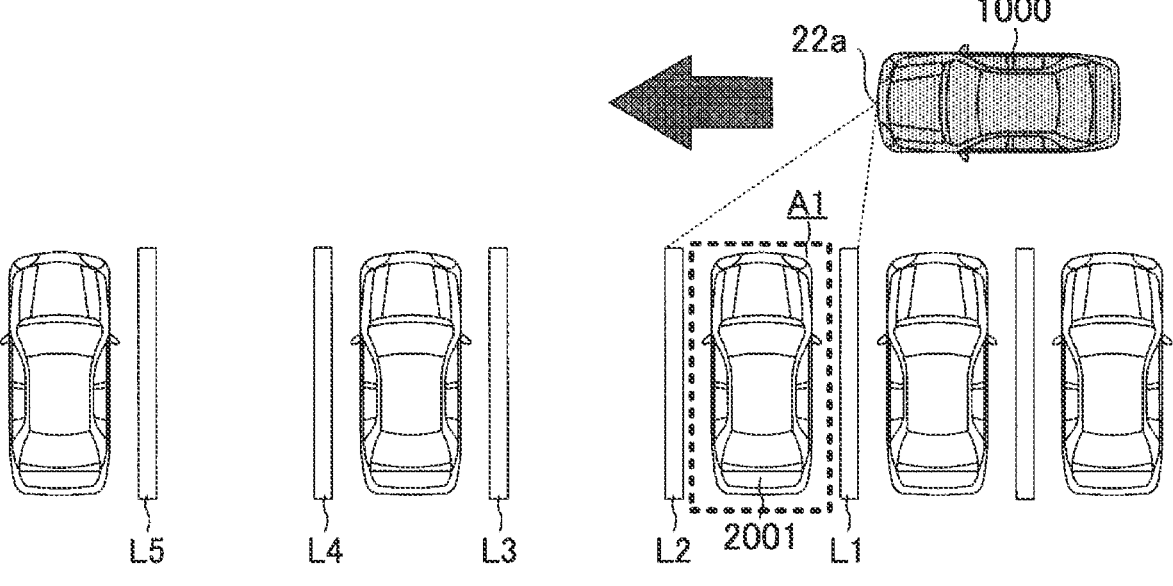
FIG. 5 illustrates a subject vehicle during a search process according to the first embodiment.

FIG. 5 illustrates the subject vehicle during the search process. The example shown in FIG. 5 illustrates the subject vehicle autonomously driving in an aisle of a parking lot where a plurality of vehicles can be parked. As shown in FIG. 5, the subject vehicle (vehicle 1000) travels straight in an aisle of the parking lot at the set vehicle speed Vs during the search process. In this case, for example, the park assist ECU 10 can detect a line of a plurality of vehicles parked perpendicularly (line of parked vehicles) in the parking lot based on information acquired by the surroundings information sensors 20A, and can control the subject vehicle so that the subject vehicle autonomously drives parallel to the detected line of parked vehicles. While the subject vehicle is driving autonomously, the park assist ECU 10 constantly monitors the surroundings of the subject vehicle based on the information acquired by the surroundings information sensors 20A. For example, when the relative distance between the subject vehicle and another vehicle present in the parking lot is less than a predetermined threshold, the park assist ECU 10 can send to the steering ECU 51 a correction signal for correcting the steering angle of the steered wheels of the subject vehicle so that the relative distance becomes equal to or greater than the threshold. In response to the correction signal, the steering ECU 51 controls the steering actuator 52 so that the steering angle of the steered wheels of the subject vehicle is corrected. The relative distance between the subject vehicle and the another parked vehicle is thus maintained at the threshold or more.

During the search process, the park assist ECU 10 searches for a parking spot based on the information acquired by the surroundings information sensors 20A while causing the subject vehicle to drive autonomously. When searching for a parking spot, the park assist ECU 10 acquires information on an object that is present around the subject vehicle as object information based on information acquired from the sonar sensor 21 and the camera sensor 22. The park assist ECU 10 plots the object information on a two-dimensional map. The two-dimensional map is, for example, a planar map in which the origin is the central position G of the subject vehicle, the X-axis extends in the longitudinal direction of the subject vehicle from the origin, and the Y-axis extends in the lateral direction of the subject vehicle from the origin. The central position G of the subject vehicle is the point of intersection of an axis passing through the middle in the lateral direction of the subject vehicle out of axes parallel to the longitudinal direction of the subject vehicle and an axis passing through the middle in the longitudinal direction of the subject vehicle out of axes parallel to the lateral direction of the subject vehicle. The object identified from the object information depicted on the two-dimensional map is recognized by the park assist ECU 10 as a three-dimensional object.

The park assist ECU 10 also acquires indication information on an area around the subject vehicle based on image data acquired from the camera sensor 22, and detects parking markings on a road surface in the area around the subject vehicle based on the acquired indication information. The park assist ECU 10 depicts the detected parking markings on the two-dimensional map. The parking markings depicted on the two-dimensional map are recognized by the park assist ECU 10 as a non-three-dimensional object.

The park assist ECU 10 detects an "object-free area" around the subject vehicle based on the object information shown on the two-dimensional map and the information on the parking markings on the road surface. When the object-free area has such a size and shape that the subject vehicle can be parked, the park assist ECU 10 determines this area to be a parking spot.

For example, during the search process, the park assist ECU 10 detects an area defined by two parking markings from the information acquired by the surroundings information sensors 20A. The park assist ECU 10 also determines whether a three-dimensional object is detected in the detected area, based on the information acquired by the surroundings information sensors 20A. When it is determined that no three-dimensional object is detected in the detected area and that the size and shape of the area are such that the subject vehicle can be parked, the park assist ECU 10 detects the area as a parking spot. During the search process, the park assist ECU 10 detects a spatial area surrounded by two three-dimensional objects (e.g., other vehicles) based on the information acquired by the surroundings information sensors 20A. The park assist ECU 10 estimates the size and shape of the detected spatial area, and determines whether the estimated size and shape of the spatial area are such that the subject vehicle can be parked. When it is determined that the size and shape of the estimated space area are such that the subject vehicle can be parked, the park assist ECU 10 detects the spatial area as a parking spot.

In the example shown in FIG. 5, the park assist ECU 10 detects an area A1 defined by two parking markings L1, L2 from an image captured by the front camera device 22a of the subject vehicle. However, the park assist ECU 10 detects a three-dimensional object (another vehicle 2001) in the area A1 from the image captured by the front camera device 22a. Therefore, the area A1 is not detected as a parking spot. When no parking spot is detected, the subject vehicle continues to drive autonomously. Therefore, the subject vehicle continues to move forward in the direction of an arrow in FIG. 5.

Figure 6:
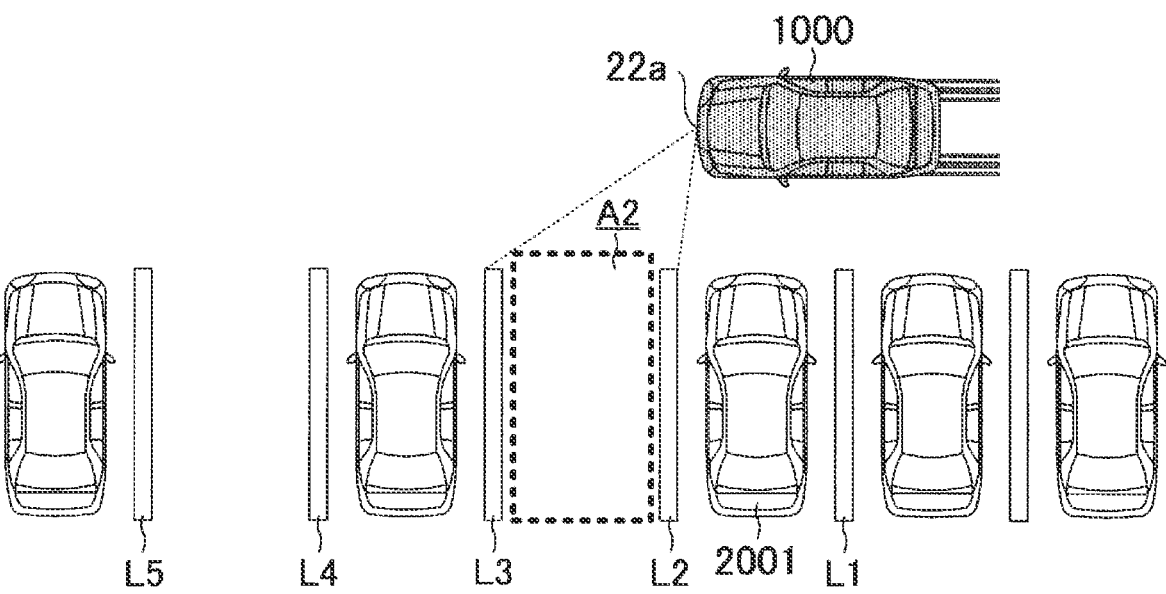
FIG. 6 illustrates a park assist electronic control unit (ECU) having detected a parking spot.

FIG. 6 illustrates the park assist ECU 10 having detected a parking spot. In the example shown in FIG. 6, the park assist ECU 10 detects an area A2 defined by two parking markings L2, L3 from an image captured by the front camera device 22a. The park assist ECU 10 does not detect any three-dimensional object (another vehicle etc.) in the area A2 from the image captured by the front camera device 22a. When it is determined that the size and shape of the area A2 are such that the subject vehicle can be parked, the area A2 is detected as a parking spot.

When a parking spot is detected by the search process, the park assist ECU 10 causes the subject vehicle to move to a predetermined position within an area around the detected parking spot by autonomous driving. The park assist ECU 10 performs a vehicle stop process when the subject vehicle approaches the predetermined position. The park assist ECU 10 performs the vehicle stop process to control the drive device 30, the braking device 40, and the steering device 50 so that the subject vehicle is stopped at the predetermined position.

Figure 7:
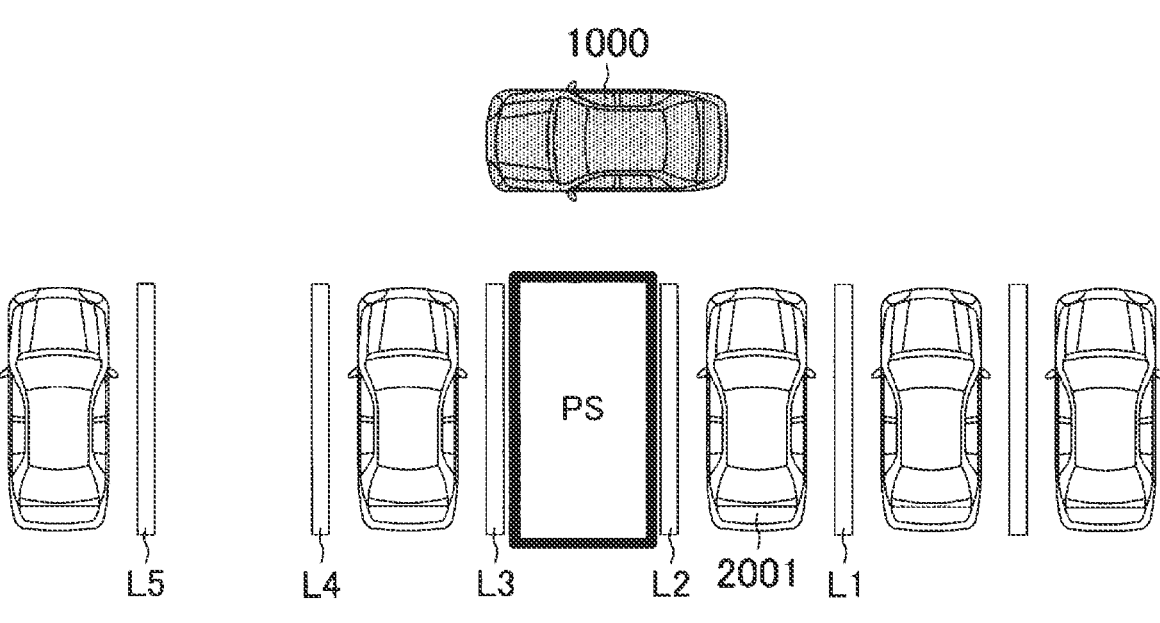
FIG. 7 illustrates the subject vehicle stopped at a predetermined position within an area around the detected parking spot.

FIG. 7 illustrates the subject vehicle stopped at the predetermined position within the area around the detected parking spot PS. In the example shown in FIG. 7, the subject vehicle is stopped at a position near the parking spot PS such that the left side of the subject vehicle faces the front (entrance) of the detected parking spot PS. The stop position of the subject vehicle with respect to the parking spot PS is preferably a position where an occupant of the subject vehicle can see the parking spot PS. The stop position of the subject vehicle with respect to the parking spot PS is preferably a position where the camera sensor 22 can recognize the size and shape of the parking spot PS. In particular, the stop position of the subject vehicle with respect to the parking spot PS is preferably a proper position that is a position suitable to start a parking process for controlling the movement and operation of the subject vehicle so that the subject vehicle is parked in the detected parking spot. The proper position is basically such a position that the side of the subject vehicle faces the front (entrance) of the parking spot and the distance between the front of the parking spot and the subject vehicle is within a predetermined distance (e.g., within one meter), as shown in FIG. 7. When the proper position is such a position, the subject vehicle can be quickly parked in the parking spot PS without having to move unnecessarily and having to repeat unnecessary forward and backward movements.

When the subject vehicle is stopped at the predetermined position with respect to the parking spot PS, the park assist ECU 10 ends the search process and performs a surroundings image display process. In the surroundings image display process, the park assist ECU 10 generates a surroundings image using the image data acquired from the camera sensor 22. The surroundings image is an image corresponding to at least part of an area around the subject vehicle, and includes camera viewpoint images and virtual viewpoint images.

The camera viewpoint images are images as viewed from the mounting positions of lenses of the camera devices. The virtual viewpoint images are images of the subject vehicle and the surroundings of the subject vehicle as viewed from virtual viewpoints set at desired positions around the subject vehicle. Methods for generating a virtual viewpoint image are well-known in the art (see, for example, Japanese Unexamined Patent Application Publication Nos. 2012-217000 (JP 2012-217000 A), 2016-192772 (JP 2016-192772 A), and 2018-107754 (JP 2018-107754 A)).

Figure 8:
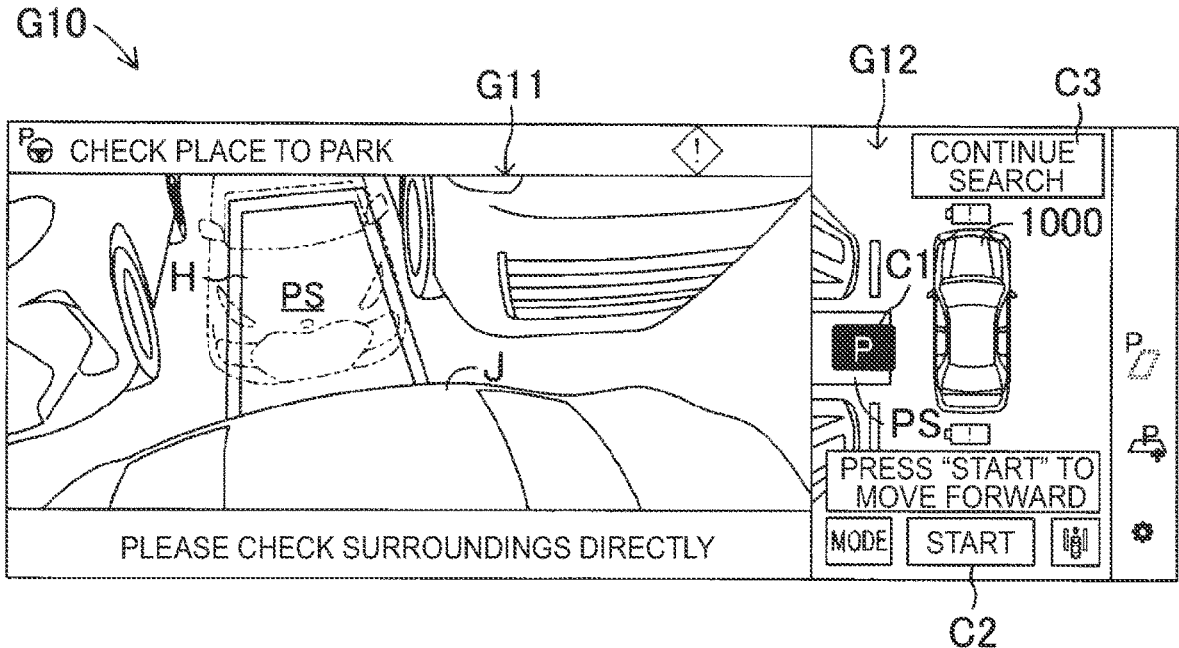
FIG. 8 shows an example of a surroundings image displayed on a display by a surroundings image display process.

The park assist ECU 10 controls the display device 70 so that a predetermined one of the generated surroundings images is displayed on the display 72. FIG. 8 shows an example of the surroundings image displayed on the display 72 by the surroundings image display process. As shown in FIG. 8, a surroundings image G10 includes a first viewpoint image G11 and a second viewpoint image G12. The first viewpoint image G11 is displayed in the left area of the surroundings image G10. The second viewpoint image G12 is displayed in the right area of the surroundings image G10.

The first viewpoint image G11 is a virtual viewpoint image of the parking spot PS as viewed from slightly above the stop position of the subject vehicle. The first viewpoint image G11 includes an image of the surroundings of the parking spot PS. For example, as shown in FIG. 8, the first viewpoint image G11 shows part of other vehicles parked on both sides of the parking spot PS. The first viewpoint image G11 includes an image J of part of the subject vehicle at the stop position of the subject vehicle. The first viewpoint image G11 may include a virtual image H of the subject vehicle parked in a predetermined area of the parking spot PS.

The second viewpoint image G12 is a virtual viewpoint image of an area around the subject vehicle including the subject vehicle and the parking spot PS as viewed from directly above the subject vehicle. As shown in FIG. 8, the second viewpoint image G12 shows, for example, the subject vehicle (vehicle 1000), part of the parking spot PS, and other vehicles located next to the parking spot PS. A parking position indication symbol C1 represented by the letter "P" is shown in the parking spot PS in the second viewpoint image G12.

A parking process start icon C2 is shown in a lower area of the second viewpoint image G12. The display ECU 71 sends a parking process start signal when the parking process start icon C2 is tapped. A continue search icon C3 is shown in an upper area of the second viewpoint image G12. The display ECU 71 sends a continue search signal when the continue search icon C3 is tapped. The park assist ECU 10 receives these signals. That is, the parking process start icon C2 and the continue search icon C3 are shown in the surroundings image G10 so that the park assist ECU 10 can receive a parking process start signal or a continue search signal. A surroundings image process for controlling the display device 70 so that the surroundings image G10 including the parking process start icon C2 and the continue search icon C3 is displayed on the display 72 corresponds to a reception process.

For example, when the front or width of the detected parking spot PS is narrow and it is predicted that it will be difficult to get in and out of the subject vehicle when the subject vehicle is parked in the parking spot PS, the occupant of the subject vehicle may not have an intention to park the subject vehicle in the detected parking spot PS. Alternatively, when the distance from the detected parking spot PS to the destination is long, the occupant of the subject vehicle may not have the intention to park the subject vehicle in the detected parking spot PS. When the occupant of the subject vehicle does not have the intention to park the subject vehicle in the detected parking spot PS, the occupant of the subject vehicle taps the continue search icon C3.

When the continue search icon C3 is tapped, it means that the occupant of the subject vehicle indicates his or her choice not to park the subject vehicle in the detected parking spot, regarding a choice as to whether to park the subject vehicle in the detected parking spot. The park assist ECU 10 receives this choice as a continue search signal.

The park assist ECU 10 resumes the search process when the continue search signal is input (received). When the search process is resumed, the park assist ECU 10 controls the subject vehicle so that the subject vehicle autonomously drives in an aisle of the parking lot at the set vehicle speed Vs, and searches for a parking spot based on the information acquired by the surroundings information sensors 20A.

Figure 9:
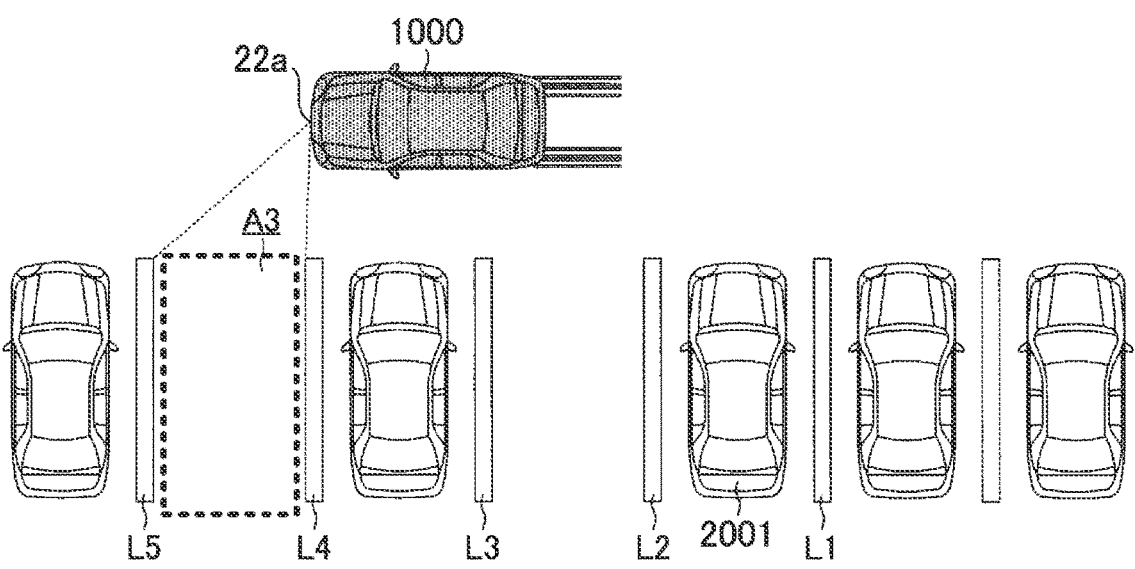
FIG. 9 illustrates the park assist ECU having detected a new parking spot after the search process is resumed.

FIG. 9 illustrates the park assist ECU 10 having detected a new parking spot after the search process is resumed. In the example shown in FIG. 9, the park assist ECU 10 detects an area A3 defined by two parking markings L4, L5 from an image captured by the front camera device 22a. The park assist ECU 10 does not detect any three-dimensional object (another vehicle etc.) in the area A3 from the image captured by the front camera device 22a. When it is determined that the size and shape of the area A3 are such that the subject vehicle can be parked, the area A3 is detected as a parking spot.

When a parking spot is detected by the resumed search process, the park assist ECU 10 causes the subject vehicle to travel to a predetermined position within an area around the detected parking spot. The park assist ECU 10 then performs the vehicle stop process to operate the subject vehicle so that the subject vehicle is stopped at the predetermined position.

Figure 10:
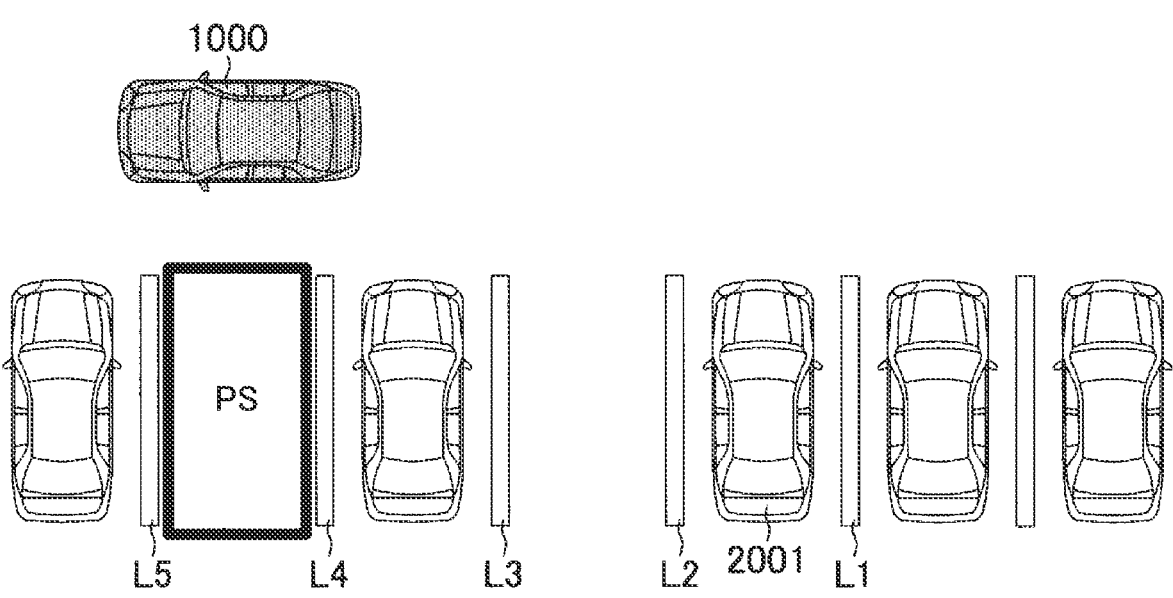
FIG. 10 illustrates the subject vehicle stopped at a predetermined position within an area around the newly detected parking spot.

FIG. 10 illustrates the subject vehicle stopped at the predetermined position within the area around the newly detected parking spot PS. In the example shown in FIG. 10, as in the example shown in FIG. 7, the subject vehicle is stopped at the predetermined position near the parking spot PS such that the left side of the subject vehicle faces the front (entrance) of the detected parking spot PS.

When the subject vehicle is stopped at the predetermined position with respect to the parking spot PS, the park assist ECU 10 ends the search process and performs the surroundings image display process. As a result, the display 72 displays the surroundings image G10 shown in FIG. 8. When the occupant of the subject vehicle has an intention to park the subject vehicle in the detected parking spot PS, the occupant of the subject vehicle taps the parking process start icon C2 in the surroundings image G10.

When the parking process start icon C2 is tapped, it means that the occupant of the subject vehicle indicates his or her choice to park the subject vehicle in the detected parking spot, regarding a choice as to whether to park the subject vehicle in the detected parking spot. The park assist ECU 10 receives this choice as a parking process start signal.

Figure 11:
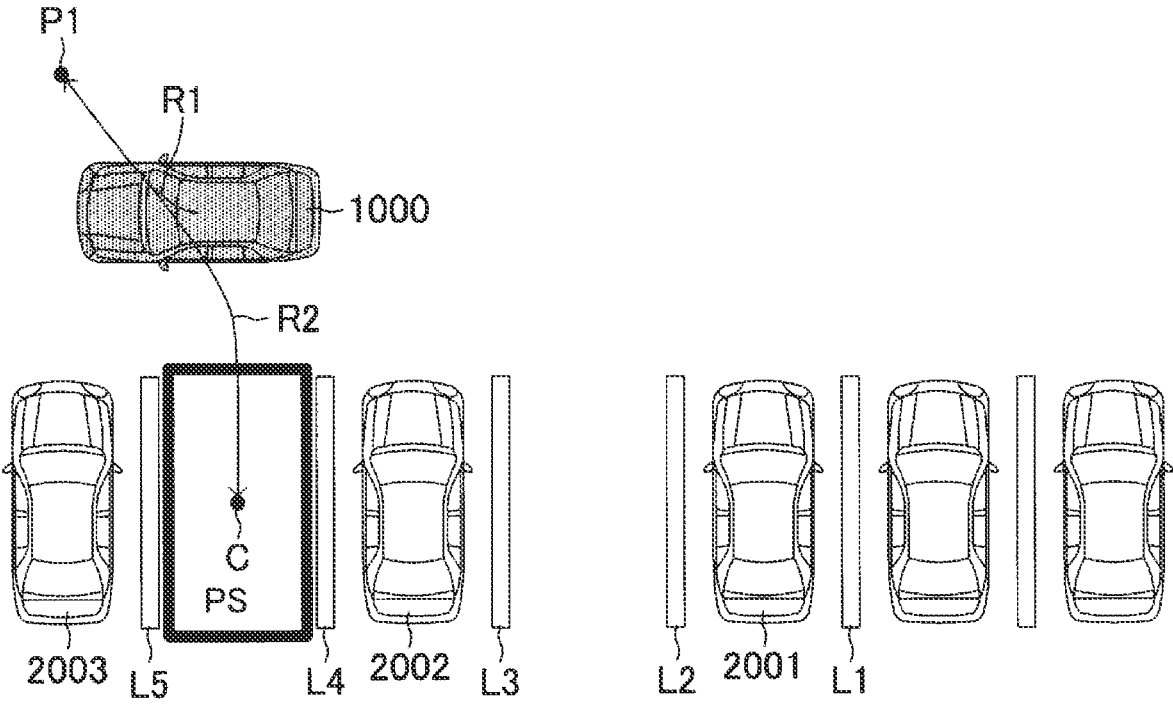
FIG. 11 illustrates forward and reverse routes calculated in a reverse perpendicular parking mode.

The park assist ECU 10 starts the parking process when the parking process start signal is input (received). When the parking process is started, the park assist ECU 10 sets the currently detected parking spot PS as a target parking spot. The park assist ECU 10 then calculates a guide route that guides the subject vehicle so that the central position G of the stopped subject vehicle moves to a predetermined target parking position C within the target parking spot and that the subject vehicle stops with a predetermined orientation at that position. The guide route is calculated based on a preset parking mode. For example, in a reverse perpendicular parking mode in which the subject vehicle is backed in and parked perpendicularly, the park assist ECU 10 calculates a forward route R1 and a reverse route R2 as shown in FIG. 11. The forward route R1 is a route along which the subject vehicle moves forward from the stop position and the central position G of the subject vehicle moves to a turnaround point P1. The reverse route R2 is a route along which the subject vehicle moves backward and the central position G of the subject vehicle moves from the turnaround point P1 to the target parking position C within the target parking spot.

The guide route is calculated based on the object information plotted on the two-dimensional map so that the subject vehicle moves from its stop position to a predetermined parking area within the target parking spot without contacting any object. For example, the guide route is calculated as a route along which the subject vehicle can move from the stop position to the predetermined parking area within the target parking spot while maintaining a predetermined distance between the subject vehicle and an object such as a fence or an adjacent vehicle.

After the guide route is calculated, the park assist ECU 10 determines a direction in which the subject vehicle moves (specifically, a target shift position of the transmission 34), a steering angle pattern, and a speed pattern in order to move the subject vehicle along the guide route.

The direction in which the subject vehicle moves is determined according to whether the subject vehicle travels along the forward route of the calculated guide route or the reverse route of the calculated guide route. When the direction in which the subject vehicle moves is determined, the park assist ECU 10 sends a shift control signal including information indicating the determined target shift position to the SBW-ECU 61 via the CAN. When the shift control signal is received from the park assist ECU 10, the SBW-ECU 61 drives the SBW actuator 63 to actuate the shift switching mechanism 64 so that the shift position of the transmission 34 is changed to the target shift position identified by the shift control signal.

The steering angle pattern is data in which the central position G of the subject vehicle on the guide route is associated with the steering angle, and is a pattern of change in target steering angle as the central position G of the subject vehicle moves along the guide route. The steering angle pattern is determined according to the shape of the calculated guide route. When the steering angle pattern is determined, the park assist ECU 10 sends a steering control signal including information indicating the target steering angle to the steering ECU 51 via the CAN based on the determined steering angle pattern. When the steering control signal is received from the park assist ECU 10, the steering ECU 51 drives the steering actuator 52 so that the steering angle of the subject vehicle matches the target steering angle corresponding to the central position G of the subject vehicle on the guide route.

The speed pattern is data in which the central position G of the subject vehicle on the guide route is associated with the travel speed, and is a pattern of change in target vehicle speed as the central position G of the subject vehicle moves along the guide route. The speed pattern is determined according to the shape of the calculated guide route, the position of the turnaround point P1, the position of the target parking position C, etc. The speed pattern is set so that the vehicle speed matches a predetermined final target vehicle speed when the central position G of the subject vehicle reaches the target parking position C. The final target vehicle speed may be zero. When the speed pattern is determined, the park assist ECU 10 sends, via the CAN, a drive control signal including information indicating a target driving force to the drive ECU 31 and a braking control signal including information indicating a target braking force to the braking ECU 41 so that the speed of the subject vehicle matches the target vehicle speed corresponding to the central position G of the subject vehicle on the guide route. When the drive control signal is received from the park assist ECU 10, the drive ECU 31 controls the drive actuator 32 so that the driving force of the drive source 33 matches the target driving force. When the braking control signal is received from the park assist ECU 10, the braking ECU 41 controls the braking actuator 42 so that the braking force matches the target braking force.

Figure 12:
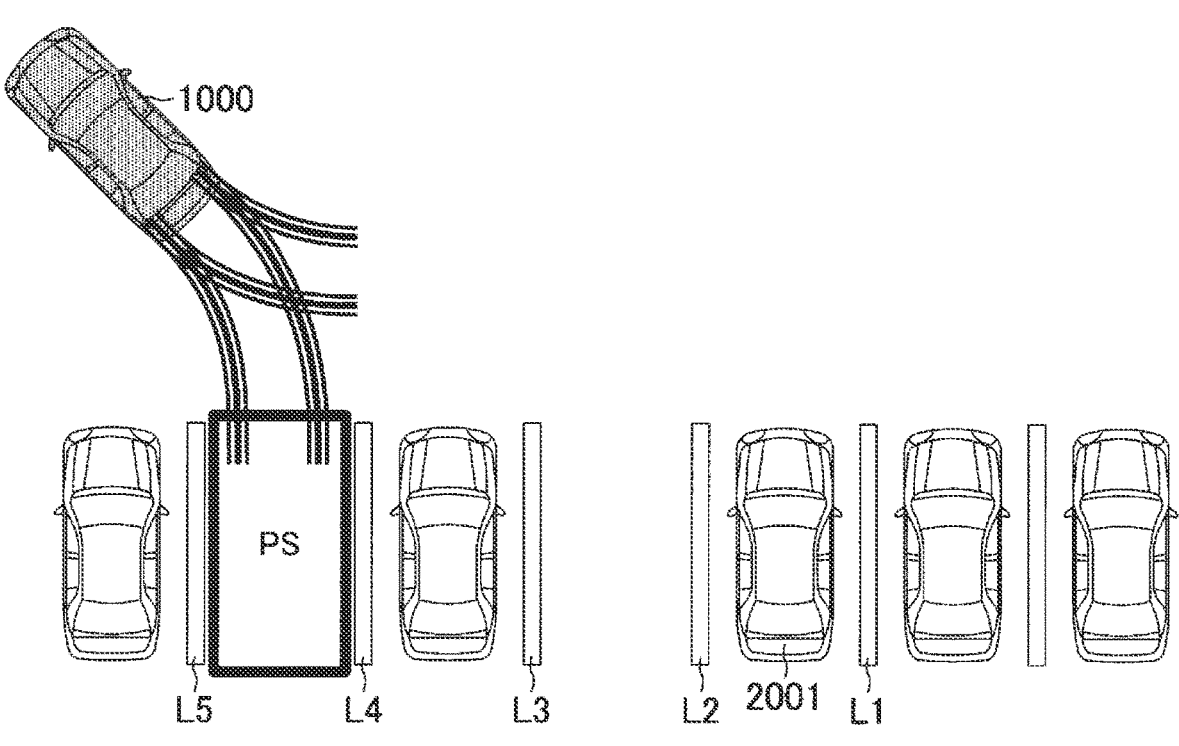
FIG. 12 illustrates the subject vehicle whose central position has reached a turnaround point as a result of the subject vehicle moving forward from its stop position along the forward route by a parking process.
Figure 13:
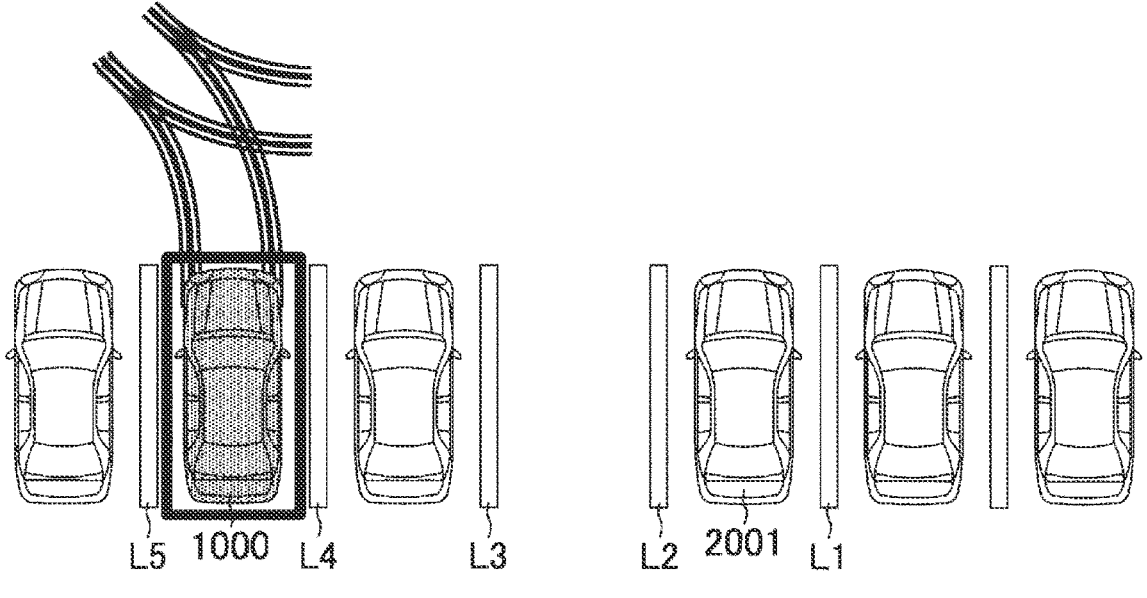
FIG. 13 illustrates the subject vehicle whose central position has reached a target parking position within a target parking spot as a result of the subject vehicle moving backward along the reverse route by the parking process.

As described above, during the parking process, the park assist ECU 10 sends the control signals to the ECUs to control the drive device 30, the braking device 40, the steering device 50, and the shift switching device 60 so that the subject vehicle moves along the guide route. The park assist device 1 thus assists in the operation of moving the subject vehicle to park the subject vehicle in the target parking spot. FIG. 12 illustrates the subject vehicle whose central position G has reached the turnaround point P1 as a result of the subject vehicle moving forward from its stop position along the forward route R1 by the parking process. FIG. 13 illustrates the subject vehicle whose central position G has reached the target parking position C within the target parking spot as a result of the subject vehicle moving backward along the reverse route R2 by the parking process.

When the central position G of the subject vehicle reaches the target parking position C within the target parking spot, the park assist ECU 10 ends the parking process and performs an end process. In the end process, the park assist ECU 10 actuates the SBW actuator 63 so that the shift position of the subject vehicle is switched to the parking position. As a result, parking lock is applied in the subject vehicle. In the end process, the park assist ECU 10 controls the display device 70 or a speaking device so that the display 72 displays that parking of the subject vehicle is completed or so that the speaking device generates voice guidance indicating that parking of the subject vehicle is completed. The park assist ECU 10 ends the automatic parking control after the end process.

When a predetermined end condition is satisfied during the automatic parking control, the park assist ECU 10 ends the automatic parking control. Specifically, the end condition is satisfied when the driver starts to operate one or more of the following parts of the subject vehicle during the automatic parking control: the accelerator pedal, the brake pedal, the steering wheel, and the shift lever.

When the automatic parking control ends without the end condition being satisfied, the driver gets out of the subject vehicle parked in the predetermined area within the target parking spot. Parking of the subject vehicle is thus completed.

Figure 14:
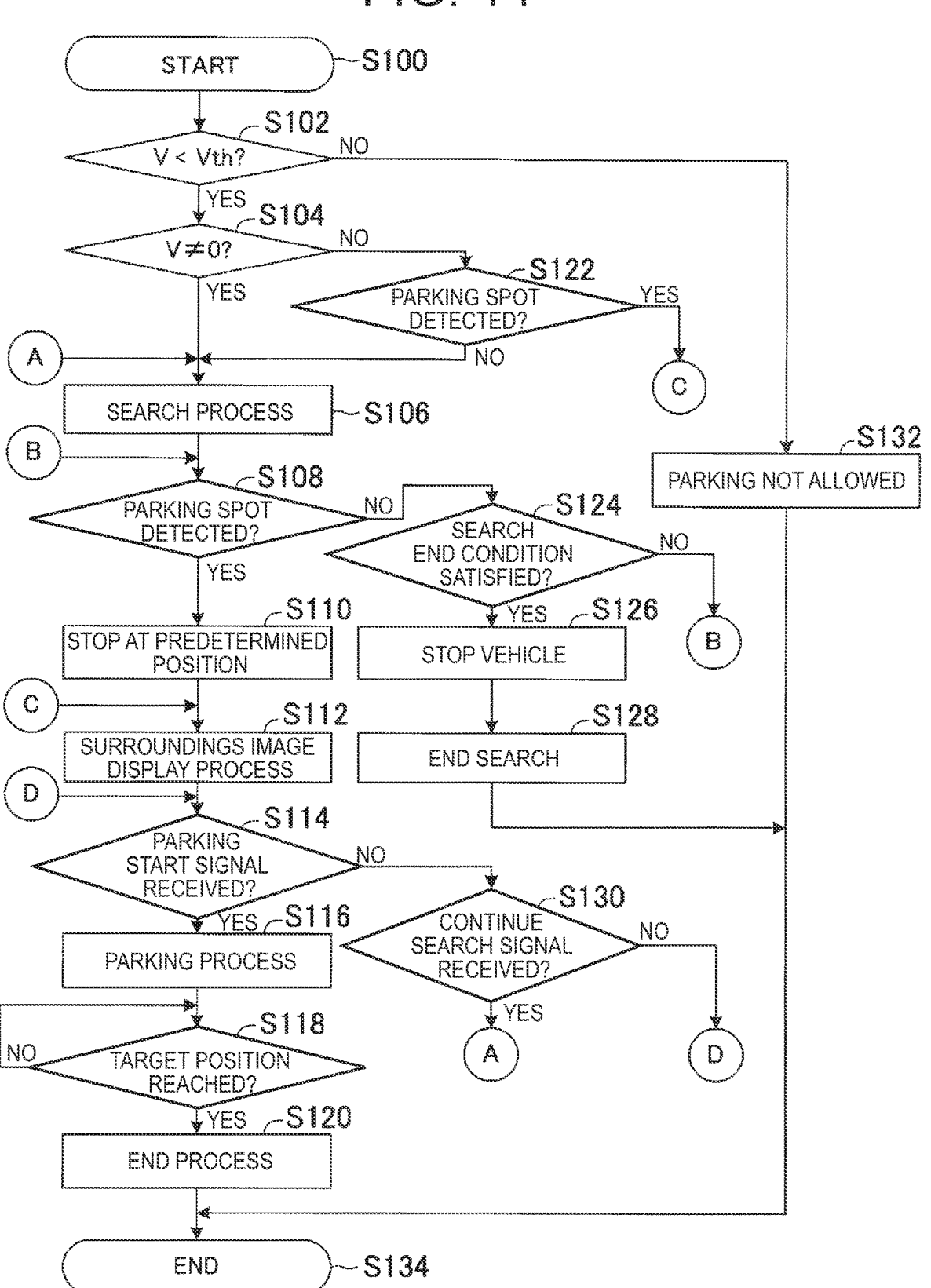
FIG. 14 is a flowchart showing an example of an automatic parking control routine that is executed by a central processing unit (CPU) of the park assist ECU according to the first embodiment.

FIG. 14 is a flowchart showing an example of an automatic parking control routine that is executed by the CPU 10$a$ of the park assist ECU 10 (hereinafter simply referred to as "CPU") in order to perform the automatic parking control described above. The automatic parking control routine shown in this flowchart is launched when the control start request switch 25 is pressed. When the automatic parking control routine is launched, the CPU starts executing the automatic parking control routine in step ("step" is hereinafter abbreviated to "S") 100. The routine then proceeds to S102.

The CPU determines in S102 whether the current vehicle speed V of the subject vehicle is less than the upper limit vehicle speed Vth. When it is determined that the current vehicle speed V is equal to or higher than the upper limit vehicle speed Vth (S102: No), the routine proceeds to S132. In S132, the CPU sends a parking not-allowed signal to the display ECU 71. As a result, the display 72 displays an image indicating that the subject vehicle cannot be parked due to the high vehicle speed. The routine then proceeds to S134, where the CPU ends the automatic parking control routine. Therefore, when the vehicle speed V is equal to or higher than the upper limit vehicle speed Vth, the substantive automatic parking control is not started even if the control start request switch 25 is pressed.

When it is determined in S102 that the current vehicle speed V of the subject vehicle is less than the upper limit vehicle speed Vth (S102: Yes), the routine proceeds to S104. In S104, the CPU determines whether the current vehicle speed V of the subject vehicle is not zero, that is, whether the subject vehicle is not stopped. When the current vehicle speed V is not zero (S104: Yes), the routine proceeds to S106. When the current vehicle speed V is zero (S104: No), the routine proceeds to S122. In S122, the CPU determines whether a parking spot has already been detected. When a parking spot has already been detected (S122: Yes), the routine proceeds to S112. When no parking spot has been detected (S122: No), the routine proceeds to S106. When No in S122, the CPU may cause the display 72 to display an image indicating that no parking space for the subject vehicle can be detected, and may then end the automatic parking control routine.

In S106, the CPU starts the search process. In the search process, the CPU controls the drive device 30, the braking device 40, and the steering device 50 of the subject vehicle so that the subject vehicle autonomously drives at the set vehicle speed Vs with the steering angle θ of 0°. The CPU detects a line of parked vehicles etc. based on the information acquired by the surroundings information sensors 20A. When a travel route to be taken by the subject vehicle can be set based on the detection results, the CPU controls the subject vehicle so that the subject vehicle autonomously drives along the set travel route. The CPU also searches for a parking spot based on the information input from the surroundings information sensors 20A. During the search process, the CPU thus searches for a parking spot while causing the subject vehicle to autonomously drive at the set vehicle speed Vs. After the CPU starts the search process, the routine proceeds to S108.

In S108, the CPU determines whether a parking spot has been detected. When no parking spot has been detected (S108: No), the routine proceeds to S124. In S124, the CPU determines whether a search end condition is satisfied. For example, the search end condition is satisfied when the time elapsed since the start of the search process reaches a preset threshold time. Alternatively, the search end condition may be satisfied when the distance traveled by the subject vehicle since the start of the search process reaches a preset threshold distance. In the case where the search end condition is satisfied when the elapsed time reaches the threshold time, the CPU measures the elapsed time with a timer after the start of the search process in S106. When it is determined in S124 that the elapsed time has reached the threshold time, it can be determined that the search end condition is satisfied. In the case where the search end condition is satisfied when the traveled distance reaches the threshold distance, the CPU calculates the distance traveled by the subject vehicle since the start of the search process in S106, based on, for example, the vehicle speed V detected by the vehicle speed sensor 23. When it is determined in S124 that the traveled distance has reached the threshold distance, it can be determined that the search end condition is satisfied.

When it is determined in S124 that the search end condition is not satisfied (S124: No), the routine returns to S108, where the CPU determines again whether a parking spot has been detected. When it is determined in S124 that the search end condition is satisfied (S124: Yes), the routine proceeds to S126. In S126, the CPU controls the drive device 30 and the braking device 40 so that the subject vehicle stops. The subject vehicle is thus stopped. The routine then proceeds to S128, where a search end signal is sent to the display ECU 71. As a result, the display 72 displays an image indicating that the search for a parking spot ends. The routine then proceeds to S134, where the CPU ends the automatic parking control routine. As described above, the automatic parking control ends when the search end condition is satisfied.

When it is determined in S108 that a parking spot has been detected (S108: Yes), the routine proceeds to S110. In S110, the CPU ends the search process and performs the vehicle stop process. By the vehicle stop process, the drive device 30, the braking device 40, and the steering device 50 of the subject vehicle are controlled so that the subject vehicle stops at a predetermined position (e.g., proper position) near the detected parking spot. When the vehicle stop process is completed, the routine proceeds to S112.

In S112, the CPU performs the surroundings image display process. As a result, the display 72 displays the surroundings image G10 such as that shown in FIG. 8. The surroundings image G10 shows the parking process start icon C2 and the continue search icon C3 that are icons for receiving a choice as to whether to choose to park the subject vehicle in the parking spot PS. When the parking process start icon C2 is tapped, a parking process start signal is input to the park assist ECU 10. When the continue search icon C3 is tapped, a continue search signal is input to the park assist ECU 10.

After the CPU performs the surroundings image display process, the routine proceeds to S114. In S114, the CPU determines whether a parking process start signal has been received. When the parking process start signal has not been received (S114: No), the process proceeds to S130. In S130, the CPU determines whether a continue search signal has been received. When the continue search signal has been received (S130: Yes), it means that the CPU has received a choice not to park the subject vehicle in the detected parking spot. In this case, the routine returns to S106, where the CPU resumes the search process. On the other hand, when the continue search signal has not been received (S130: No), the routine returns to S114, and the CPU repeats S114 and the subsequent steps.

When it is determined in S114 that the parking process start signal has been received (S114: Yes), it means that the CPU has received a choice to park the subject vehicle in the detected parking spot. In this case, the routine proceeds to S116. In S116, the CPU starts the parking process. As a result, the detected parking spot is set as a target parking spot, and the park assist device 1 performs the operation of moving the subject vehicle to park the subject vehicle in the target parking spot. Specifically, the CPU calculates a guide route that guides the subject vehicle from its stop position so that the subject vehicle is parked in the predetermined area of the target parking spot. The CPU controls the drive device 30, the braking device 40, the steering device 50, and the shift switching device 60 so that the subject vehicle moves from its stop position along the guide route.

Thereafter, the routine proceeds to S118. In S118, the CPU determines whether the central position G of the subject vehicle has reached the target parking position C within the target parking spot. When it is determined that the central position G of the subject vehicle has not reached the target parking position C (S118: No), the CPU repeats the determination in S118. When it is determined that the central position G of the subject vehicle has reached the target parking position C (S118: Yes), the routine proceeds to S120. In S120, the CPU performs the end process. A notification that parking of the subject vehicle has been completed is sent by the end process. The routine then proceeds to S134, where the CPU ends the automatic parking control routine.

As described above, the park assist device 1 according to the present embodiment includes the surroundings information sensors 20A configured to acquire information on objects and indications that are present around the subject vehicle, and the park assist ECU 10 configured to perform the automatic parking control for controlling the subject vehicle so that the subject vehicle is parked in a parking spot. When a request to start the automatic parking control is detected while the subject vehicle is traveling at a vehicle speed less than the upper limit vehicle speed Vth, the park assist ECU 10 performs the search process for searching for a parking spot based on the information acquired by the surroundings information sensors 20A. When a parking spot is detected by the search process, the park assist ECU 10 performs the surroundings image display process as a reception process for receiving a choice as to whether to park the subject vehicle in the detected parking spot. When a choice to park the subject vehicle in the detected parking spot is received, the park assist ECU 10 performs the parking process for controlling the movement and operation of the subject vehicle so that the subject vehicle is parked in the detected parking spot.

According to the park assist device 1 of the present embodiment, the automatic parking control can be started even when the park assist ECU 10 detects a request to start the automatic parking control while the subject vehicle is traveling, that is, when the subject vehicle is not stopped. It is therefore not necessary for the driver of the subject vehicle to stop the subject vehicle at a predetermined position in order to park the subject vehicle. This can improve convenience in performing the automatic parking control by the park assist device 1.

The park assist ECU 10 causes the subject vehicle to autonomously drive at the preset set vehicle speed Vs during the search process. Therefore, by setting the set vehicle speed Vs to a predetermined low speed such as a speed of 5 km/h or more and 10 km/h or less, the safety of the subject vehicle during the search process can be enhanced.

The park assist ECU 10 resumes the search process when a choice not to park the subject vehicle in the detected parking spot is received after the surroundings image display process is started, that is, when a continue search signal is input after the surroundings image display process is started. It is therefore possible to search for another parking spot when the occupant of the subject vehicle does not have an intention to park the subject vehicle in the detected parking spot.

When a parking spot is detected by the search process, the park assist ECU 10 performs the vehicle stop process to control the subject vehicle so that the subject vehicle stops at a predetermined position within the area around the detected parking spot. The occupant of the subject vehicle can therefore see the size of the detected parking spot etc. from the stop position of the subject vehicle. When the predetermined position is a proper position for starting the parking process for controlling the movement and operation of the subject vehicle so that the subject vehicle is parked in the detected parking spot, it is possible to reduce the burden of driving on the driver of the subject vehicle that is caused by the driver of the subject vehicle having to search for the proper position.

The park assist ECU 10 ends the search process when a preset amount of time has elapsed since the start of the search process without detection of any parking spot, or when the subject vehicle has traveled a preset distance since the start of the search process without detection of any parking spot. This can prevent wasting time due to continuing the search process even though there is no parking spot.

The park assist device 1 also includes the display device 70 for inputting a choice as to whether to park the subject vehicle in the parking spot detected by the search process. The choice input through the display device 70 is input to (received by) the park assist ECU 10 as a parking process start signal or a continue search signal. The park assist ECU 10 can thus perform a process according to the choice.

Second Embodiment

In the first embodiment, when a parking spot is detected by the search process, the subject vehicle is stopped at a predetermined position near the detected parking spot. When it is chosen to park in the detected parking spot, the parking process is performed so that the subject vehicle is parked in that parking spot. When it is chosen not to park in the detected parking spot, the search process is resumed. On the other hand, a second embodiment illustrates an example in which, when a parking spot is detected by the search process, the subject vehicle is parked in the detected parking spot without stopping.

A park assist device 1A according to the present embodiment includes a park assist ECU 10A, the in-vehicle sensors 20, the control start request switch 25, the drive device 30, the braking device 40, the steering device 50, the shift switching device 60, the display device 70, and the navigation device 80. These configurations are basically the same as those described in the first embodiment. Therefore, the description of each configuration of the park assist device 1 according to the first embodiment and FIG. 1 can be referred to for each configuration of the park assist device 1A according to the present embodiment.

The driver of the subject vehicle equipped with the park assist device 1A presses the control start request switch 25 when the driver wants to park the subject vehicle. For example, the driver of the subject vehicle presses the control start request switch 25 when the driver is driving the subject vehicle at a low speed in order to find a parking spot to park the subject vehicle after the subject vehicle enters a parking lot where a plurality of vehicles can be parked.

When the control start request switch 25 is pressed, the park assist ECU 10A detects that the control start request switch 25 is in the ON state. When the park assist ECU 10A detects that the control start request switch 25 is in the ON state, that is, when the park assist ECU 10A detects a request to start automatic parking control, the park assist ECU 10A starts the automatic parking control. When the automatic parking control is started, the park assist ECU 10A first acquires a current vehicle speed V of the subject vehicle from the vehicle speed sensor 23. Next, the park assist ECU 10A determines whether the current vehicle speed V of the subject vehicle is less than the preset upper limit vehicle speed Vth. When the current vehicle speed V of the subject vehicle is less than the upper limit vehicle speed Vth, the park assist ECU 10A determines whether the subject vehicle is not stopped, that is, whether the vehicle speed V of the subject vehicle is not 0 km/h. When the subject vehicle is not stopped, the park assist ECU 10A performs the search process.

In the search process, the park assist ECU 10A controls the subject vehicle so that the vehicle speed V of the subject vehicle becomes the preset set vehicle speed Vs and the steering angle θ becomes 0°. As a result, the subject vehicle autonomously drives at the set vehicle speed Vs.

Figure 15:
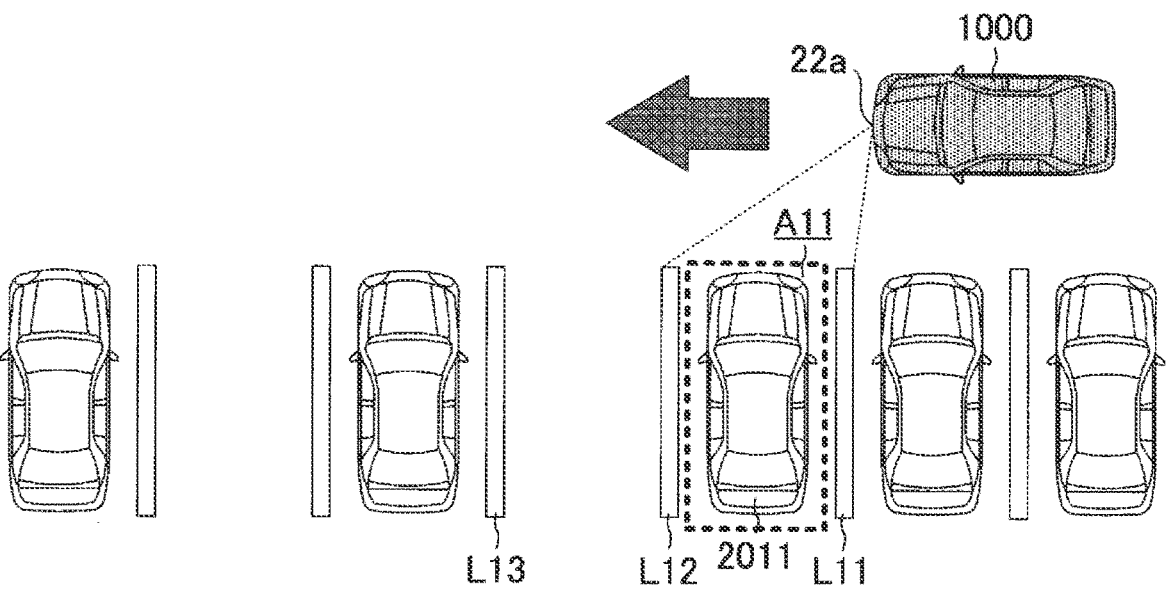
FIG. 15 illustrates a subject vehicle during a search process according to a second embodiment.

FIG. 15 illustrates the subject vehicle during the search process. The example shown in FIG. 15 illustrates the subject vehicle autonomously driving in an aisle of a parking lot where a plurality of vehicles can be parked. As shown in FIG. 15, the subject vehicle (vehicle 1000) travels straight in an aisle of the parking lot at the set vehicle speed Vs during the search process. In this case, for example, the park assist ECU 10A can detect a line of a plurality of vehicles parked perpendicularly (line of parked vehicles) in the parking lot based on information acquired by the surroundings information sensors 20A, and can control the subject vehicle so that the subject vehicle autonomously drives parallel to the detected line of parked vehicles. While the subject vehicle is driving autonomously, the park assist ECU 10A constantly monitors the surroundings of the subject vehicle based on the information acquired by the surroundings information sensors 20A. For example, when the relative distance between the subject vehicle and another vehicle present in the parking lot is less than a predetermined threshold, the park assist ECU 10A can send to the steering ECU 51 a correction signal for correcting the steering angle of the steered wheels of the subject vehicle so that the relative distance becomes equal to or greater than the threshold. In response to the correction signal, the steering ECU 51 controls the steering actuator 52 so that the steering angle of the steered wheels of the subject vehicle is corrected. The relative distance between the subject vehicle and the another parked vehicle is thus maintained at the threshold or more.

During the search process, the park assist ECU 10A searches for a parking spot based on the information input from the surroundings information sensors 20A while causing the subject vehicle to drive autonomously. The search method described in the first embodiment can be used.

In the example shown in FIG. 15, the park assist ECU 10A detects an area A11 defined by two parking markings L11, L12 from an image captured by the front camera device 22a of the subject vehicle. However, the park assist ECU 10A detects a three-dimensional object (another vehicle 2011) in the area A11 from the image captured by the front camera device 22a. Therefore, the area A11 is not detected as a parking spot. When no parking spot is detected, the subject vehicle continues to drive autonomously. Therefore, the subject vehicle continues to move forward in the direction of an arrow in FIG. 15.

Figure 16:
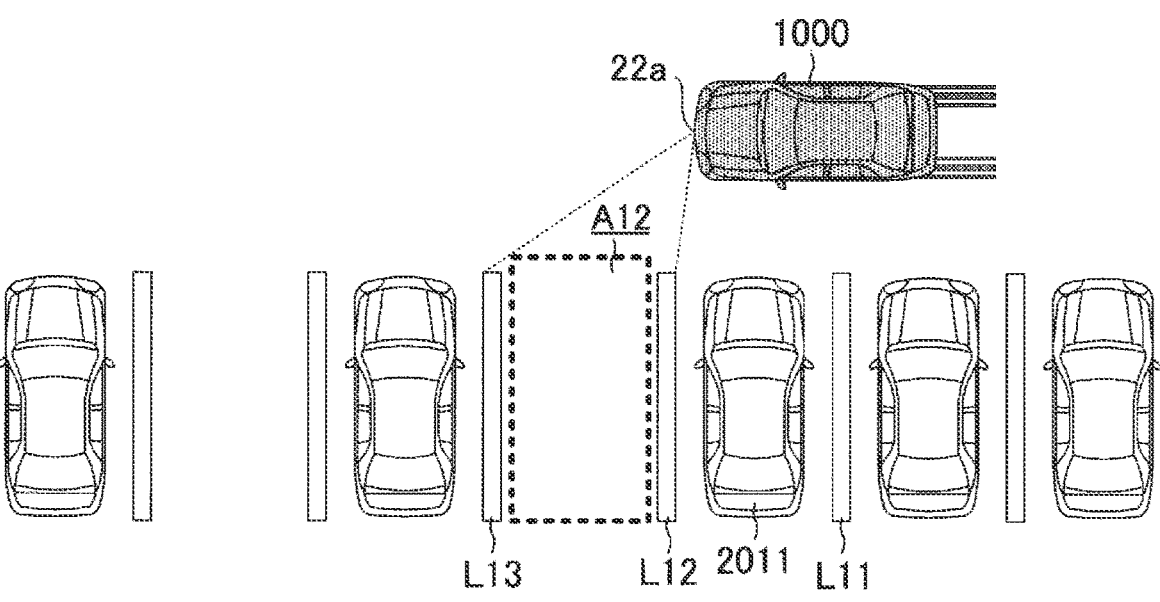
FIG. 16 illustrates a park assist ECU having detected a parking spot.

FIG. 16 illustrates the park assist ECU 10A having detected a parking spot. In the example shown in FIG. 16, the park assist ECU 10A detects an area A12 defined by two parking markings L12, L13 from an image captured by the front camera device 22a. The park assist ECU 10A does not detect any three-dimensional object (another vehicle etc.) in the area A12 from the image captured by the front camera device 22a. Therefore, the area A12 is not detected as a parking spot.

When a parking spot is detected by the search process, the park assist ECU 10A ends the search process. The park assist ECU 10A starts the parking process after ending the search process. In this case, the park assist ECU 10A controls the subject vehicle so that the process can seamlessly shift from the search process to the parking process without stopping the subject vehicle. A run-up process may be performed in which the subject vehicle travels from the end of the search process to the start of the parking process so that the process can shift from the search process to the parking process without stopping the subject vehicle.

When a parking spot is detected by the search process, the park assist ECU 10A can control the display device 70 so that the display 72 displays an image indicating that a parking spot has been detected and that the subject vehicle is to be parked in the detected parking spot. Alternatively, the park assist ECU 10A may inform the occupant of the subject vehicle by voice guidance etc. that a parking spot has been detected and that the subject vehicle is to be parked in the detected parking spot.

When a parking spot is detected by the search process, the park assist ECU 10A sets the detected parking spot as a target parking spot. The park assist ECU 10A then calculates a guide route that guides the subject vehicle so that the central position G of the subject vehicle moves to a predetermined target parking position C within the target parking spot and that the subject vehicle stops with a predetermined orientation at that position. The starting point of the guide route may be the position (detection position) of the subject vehicle when the parking spot is detected by the search process. Alternatively, the starting point of the guide route may be a proper position that is a position suitable to start the parking process for controlling the movement and operation of the subject vehicle so that the subject vehicle is parked in the target parking spot. When the starting point of the guide route is the proper position, the section from the detection position to the proper position is a section (run-up section) in which the run-up process for causing the subject vehicle to travel so that the process smoothly shifts from the search process to the parking process without stopping the subject vehicle is performed. In this case, the park assist ECU 10A calculates the guide route while the subject vehicle is traveling in the run-up section. Hereinafter, an example in which the run-up process is performed between the search process and the parking process will be described.

Figure 17:
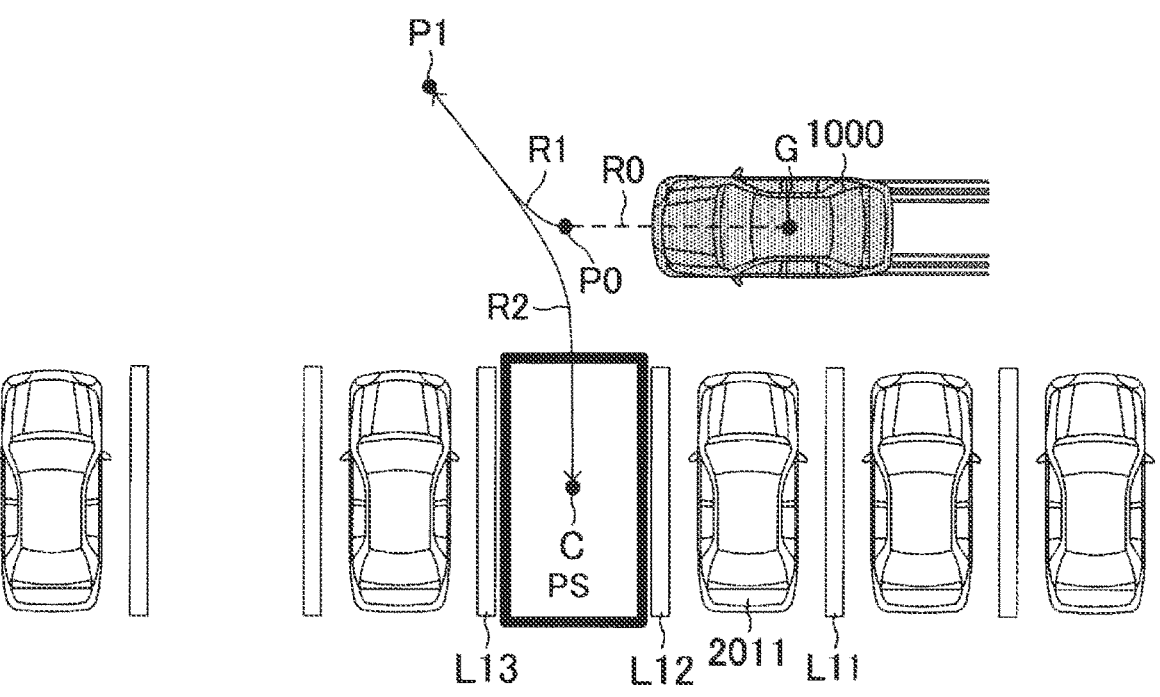
FIG. 17 illustrates forward and reverse routes calculated in the reverse perpendicular parking mode.

FIG. 17 shows a guide route calculated by the park assist ECU 10A. In the example shown in FIG. 17, the guide route whose starting point is a proper position P0 for the parking spot PS (target parking spot) is calculated. Therefore, a section R0 from the detection position (the central position G of the subject vehicle shown in FIG. 17) to the proper position P0 as shown by a dashed line is the run-up section. The proper position P0 shown in FIG. 17 represents the position of the central position G of the subject vehicle when the subject vehicle is located at the proper position.

According to the example shown in FIG. 17, the park assist ECU 10A calculates the forward route R1 and the reverse route R2. The forward route R1 is a route along which the subject vehicle moves forward so that the central position G of the subject vehicle moves from the proper position P0 to the turnaround point P1. The reverse route R2 is a route along which the subject vehicle moves backward so that the central position G of the subject vehicle moves from the turnaround point P1 to the target parking position C within the target parking spot. The guide route is calculated so that the subject vehicle moves to a predetermined parking area within the target parking spot without contacting any object. For example, the guide route is calculated as a route along which the subject vehicle can move to the predetermined parking area within the target parking spot while maintaining a predetermined distance between the subject vehicle and an object such as a fence or an adjacent vehicle.

After the guide route is calculated, the park assist ECU 10A determines a direction in which the subject vehicle moves (specifically, a target shift position of the transmission 34), a steering angle pattern, and a speed pattern in order to move the subject vehicle along the guide route. Since the direction in which the subject vehicle moves, the steering angle pattern, and the speed pattern are the same as the direction in which the subject vehicle moves, the steering angle pattern, and the speed pattern that are described in the first embodiment, description thereof will be omitted. However, the speed pattern is determined so that the vehicle speed of the subject vehicle at the position of the starting point of the guide route matches the vehicle speed of the subject vehicle immediately before the position of the starting point. For example, according to the example shown in FIG. 17, the vehicle speed of the subject vehicle at the position of the starting point of the forward route R1 (proper position P0) is determined to match the speed of the subject vehicle at the end point of the run-up section. This can reduce a change in speed of the subject vehicle when the process shifts from the search process to the parking process or when the process shifts from the search process to the parking process through the run-up process.

Figure 18:
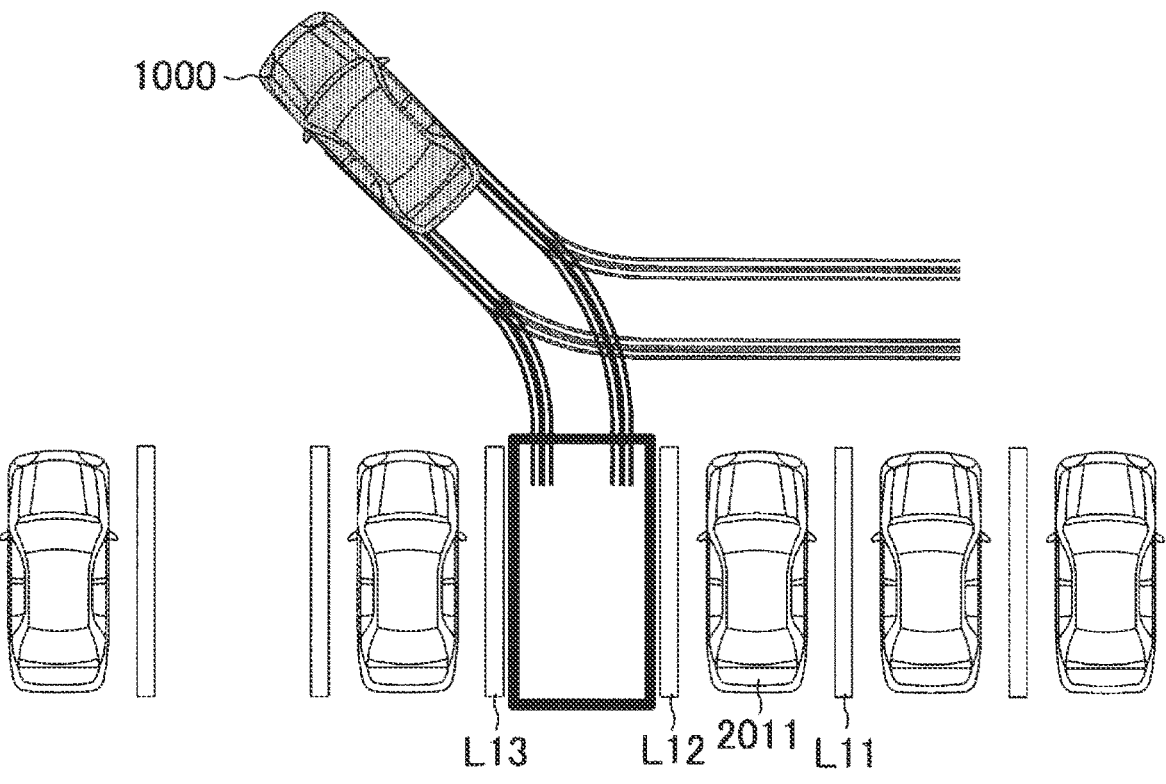
FIG. 18 illustrates the subject vehicle whose central position has reached a turnaround point as a result of the subject vehicle moving forward from its stop position along the forward route by a parking process.
Figure 19:
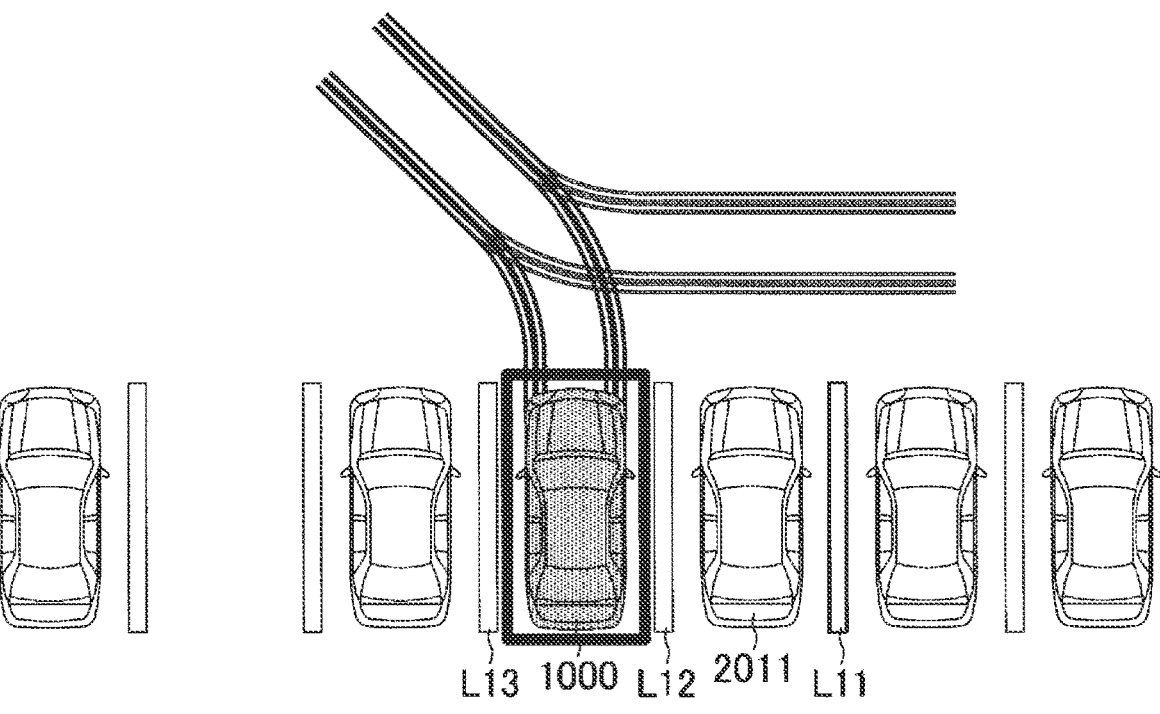
FIG. 19 illustrates the subject vehicle whose central position has reached a target parking position within a target parking spot as a result of the subject vehicle moving backward along the reverse route by the parking process.

After the direction in which the subject vehicle moves, the steering angle pattern, and the speed pattern are determined, the park assist ECU 10A determines whether the central position G of the subject vehicle has reached the proper position P0. When it is determined that the central position G of the subject vehicle has reached the proper position P0, the run-up process is ended and the parking process is started. When the parking process is started, the park assist ECU 10A controls the drive device 30, the braking device 40, the steering device 50, and the shift switching device 60 so that the subject vehicle moves along the guide route based on the determined direction in which the subject vehicle moves, steering angle pattern, and speed pattern. The park assist device 1 thus assists in the operation of moving the subject vehicle to park the subject vehicle in the target parking spot. FIG. 18 illustrates the subject vehicle whose central position G has reached the turnaround point P1 as a result of the subject vehicle moving forward along the forward route R1 by the parking process. FIG. 19 illustrates the subject vehicle whose central position G has reached the target parking position C within the target parking spot as a result of the subject vehicle moving backward along the reverse route R2 by the parking process.

When the central position G of the subject vehicle reaches the target parking position C within the target parking spot, the park assist ECU 10A performs the end process. In the end process, the park assist ECU 10A actuates the SBW actuator 63 so that the shift position of the subject vehicle is switched to the parking position. As a result, parking lock is applied in the subject vehicle. In the end process, the park assist ECU 10A controls the display device 70 or the speaking device so that the display 72 displays that parking of the subject vehicle is completed or so that the speaking device generates voice guidance indicating that parking of the subject vehicle is completed. The park assist ECU 10A ends the automatic parking control after the end process.

When a predetermined end condition is satisfied during the automatic parking control, the park assist ECU 10A ends the automatic parking control. Specifically, the end condition is satisfied when the driver starts to operate one or more of the following parts of the subject vehicle during the automatic parking control: the accelerator pedal, the brake pedal, the steering wheel, and the shift lever.

When the automatic parking control ends without the end condition being satisfied, the driver gets out of the subject vehicle parked in the predetermined area within the target parking spot.

Figure 20:
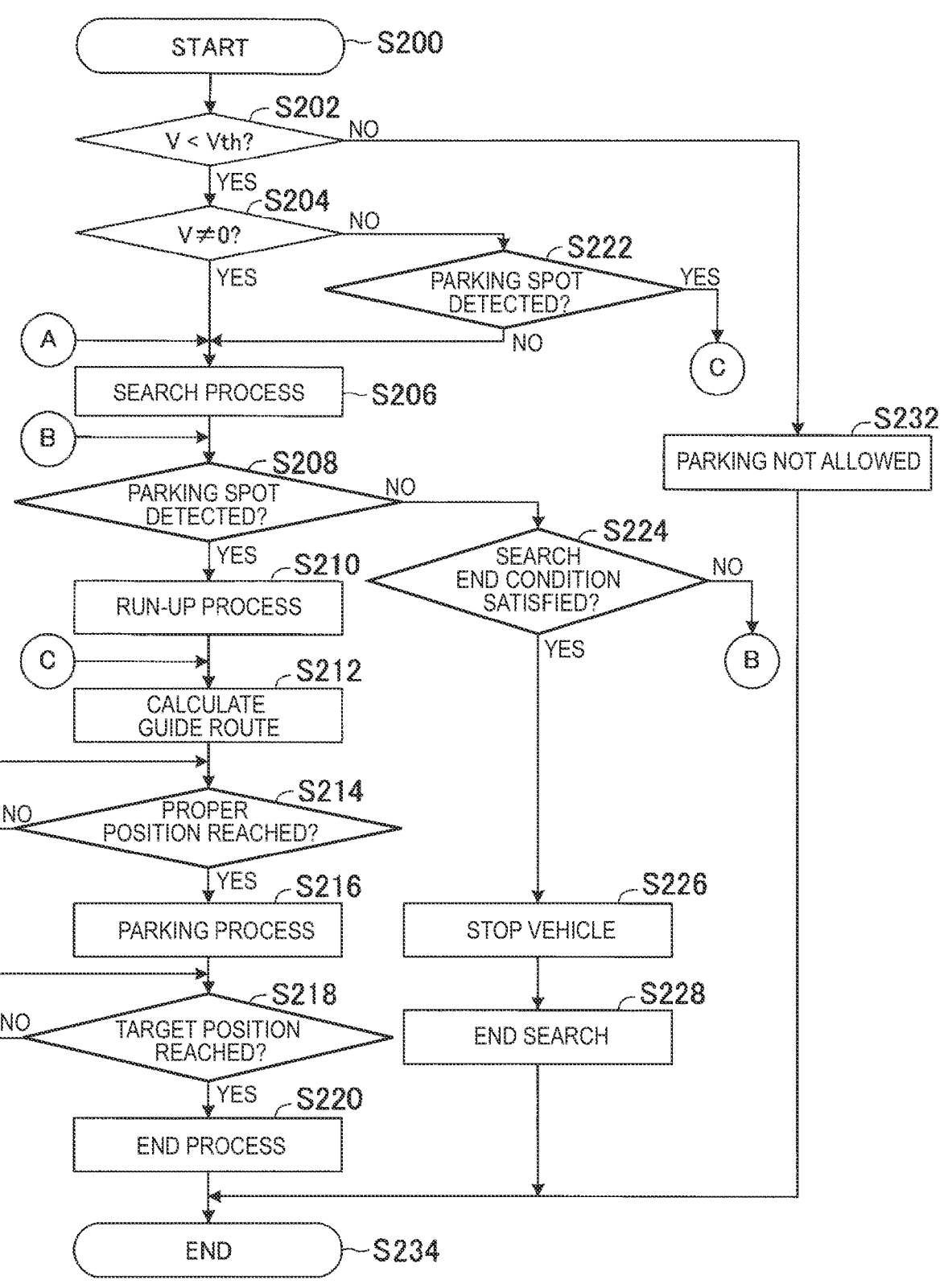
FIG. 20 is a flowchart showing an example of an automatic parking control routine that is executed by a CPU of the park assist ECU according to the second embodiment.

FIG. 20 is a flowchart showing an example of an automatic parking control routine that is executed by the CPU 10a of the park assist ECU 10A (hereinafter simply referred to as "CPU") according to the second embodiment. The automatic parking control routine shown in this flowchart is launched when the control start request switch 25 is pressed. When the automatic parking control routine is launched, the CPU starts executing the automatic parking control routine in step ("step" is hereinafter abbreviated to "S") 200. The routine then proceeds to S202.

The CPU determines in S202 whether the current vehicle speed V of the subject vehicle is less than the upper limit vehicle speed Vth. When it is determined that the current vehicle speed V is equal to or higher than the upper limit vehicle speed Vth (S202: No), the routine proceeds to S232. In S232, the CPU sends a parking not-allowed signal to the display ECU 71. As a result, the display 72 displays an image indicating that the subject vehicle cannot be parked due to the high vehicle speed. The routine then proceeds to S234, where the CPU ends the automatic parking control routine. When it is determined that the current vehicle speed V of the subject vehicle is less than the upper limit vehicle speed Vth (S202: Yes), the routine proceeds to S204.

In S204, the CPU determines whether the current vehicle speed V of the subject vehicle is not zero, that is, whether the subject vehicle is not stopped. When the current vehicle speed V is not zero (S204: Yes), the routine proceeds to S206. When the current vehicle speed V is zero (S204: No), the routine proceeds to S222. In S222, the CPU determines whether a parking spot has already been detected. When a parking spot has already been detected (S222: Yes), the routine proceeds to S212. When no parking spot has been detected (S222: No), the routine proceeds to S206. When No in S222, the CPU may cause the display 72 to display an image indicating that no parking space for the subject vehicle can be detected, and may then end the automatic parking control routine.

In S206, the CPU starts the search process. In the search process, the CPU controls the drive device 30, the braking device 40, and the steering device 50 of the subject vehicle so that the subject vehicle autonomously drives at the set vehicle speed Vs with the steering angle θ of 0°. The CPU detects a line of parked vehicles etc. based on the information acquired by the surroundings information sensors 20A. When a travel route to be taken by the subject vehicle can be set based on the detection results, the CPU controls the subject vehicle so that the subject vehicle autonomously drives along the set travel route. The CPU also searches for a parking spot based on the information input from the surroundings information sensors 20A. During the search process, the CPU thus searches for a parking spot while causing the subject vehicle to autonomously drive at the set vehicle speed Vs. After the CPU starts the search process, the routine proceeds to S208.

In S208, the CPU determines whether a parking spot has been detected. When no parking spot has been detected (S208: No), the routine proceeds to S224. In S224, the CPU determines whether a search end condition is satisfied. For example, the search end condition is satisfied when the time elapsed since the start of the search process reaches a preset threshold time. Alternatively, the search end condition may be satisfied when the distance traveled by the subject vehicle since the start of the search process reaches a preset threshold distance.

When it is determined in S224 that the search end condition is not satisfied (S224: No), the routine returns to S208, where the CPU determines again whether a parking spot has been detected. When it is determined in S224 that the search end condition is satisfied (S224: Yes), the routine proceeds to S226. In S226, the CPU stops the subject vehicle. The routine then proceeds to S228, where a search end signal is sent to the display ECU 71. As a result, the display 72 displays an image indicating that the search for a parking spot ends. The routine then proceeds to S234, where the CPU ends the automatic parking control routine.

When it is determined in S208 that a parking spot has been detected (S208: Yes), the routine proceeds to S210. In S210, the CPU starts the run-up process. As a result, the subject vehicle autonomously drives at a predetermined low speed so that the central position G of the subject vehicle moves from the position when a parking spot is detected (detection position) toward the proper position P0. After the run-up process is started, the CPU may control the display device 70 so that the display 72 displays an image indicating that a parking spot has been detected and that the subject vehicle is to be parked in the detected parking spot.

The routine then proceeds to S212. In S212, the CPU calculates a guide route whose starting point is the proper position P0. For example, the CPU calculates the forward route R1 and the reverse route R2 that are shown in FIG. 17.

Thereafter, the routine proceeds to S214. In S214, the CPU determines whether the central position G of the subject vehicle has reached the proper position P0. When it is determined that the central position G of the subject vehicle has not reached the proper position P0 (S214: No), the CPU repeats S214. When it is determined that the central position G of the subject vehicle has reached the proper position P0 (S214: Yes), the routine proceeds to S216.

In S216, the CPU ends the run-up process and starts the parking process. As a result, the detected parking spot is set as a target parking spot, and the park assist device 1 assists in the operation of moving the subject vehicle to park the subject vehicle in the target parking spot. Specifically, the CPU controls the drive device 30, the braking device 40, the steering device 50, and the shift switching device 60 of the subject vehicle so that the subject vehicle moves to a predetermined parking area within the target parking spot along the guide route. The vehicle speed of the subject vehicle at the start of the parking process is equal to the vehicle speed of the subject vehicle at the end of the run-up process. Therefore, the process switches from the run-up process to the parking process while the subject vehicle is traveling.

Subsequently, the routine proceeds to S218. In S218, the CPU determines whether the central position G of the subject vehicle has reached the target parking position C within the target parking spot. When it is determined that the central position G of the subject vehicle has not reached the target parking position C (S218: No), the CPU repeats the determination in S218. When it is determined that the central position G of the subject vehicle has reached the target parking position C (S218: Yes), the routine proceeds to S220. In S220, the CPU performs the end process. A notification that parking of the subject vehicle has been completed is sent by the end process. The routine then proceeds to S234, where the CPU ends the automatic parking control routine.

As described above, when the park assist ECU 10A of the present embodiment detects a request to start the automatic parking control while the subject vehicle is traveling, the park assist ECU 10A performs the search process for searching for a parking spot based on the information acquired by the surroundings information sensors 20A while causing the subject vehicle to autonomously drive at the preset set vehicle speed Vs. When a parking spot is detected by the search process, the park assist ECU 10A performs the run-up process, and then starts the parking process for controlling the movement and operation of the subject vehicle so that the subject vehicle is parked in the detected parking spot. At this time, the process seamlessly shifts from the search process to the parking process via the run-up process. That is, the process shifts from the search process to the parking process via the run-up process without the subject vehicle stopping. That is, when a parking spot is detected, the subject vehicle is parked in the detected parking spot without stopping. The subject vehicle is thus automatically parked in the shortest time after the request to start the automatic parking control is detected. Therefore, the occupant of the subject vehicle can promptly perform actions after parking.

Although the embodiments of the present disclosure are described above, the present disclosure should not be construed as being limited to the embodiments. For example, the first embodiment illustrates an example in which, when a parking spot is detected, the park assist ECU 10 causes the display 72 to display such a surroundings image G10 including the parking process start icon C2 and the continue search icon C3 as shown in FIG. 8. However, an image other than the example shown in FIG. 8 can be used as long as it is an image that allows input of a choice as to whether to park in the detected parking spot. For example, when a parking spot is detected, the park assist ECU 10 may cause the display 72 to display an icon showing a text image of "Yes" and an icon showing a text image of "No" together with a text image saying "Do you want to park in the detected parking spot?" In this case, when the icon showing the text image of "Yes" is tapped, the park assist ECU 10 receives a choice to park the subject vehicle in the detected parking spot. When the icon showing the text image of "No" is tapped, the park assist ECU 10 receives a choice not to park the subject vehicle in the detected parking spot.

In the first and second embodiments, at the start of the search process, the park assist ECU 10, 10A may control the display device 70 so that the display 72 displays an image indicating the start of searching for a parking spot. During the search process, the park assist ECU 10, 10A may control the display device 70 so as to display such a surroundings image G10 as shown in FIG. 8 from which text images including the parking process start icon C2 and the continue search icon C3 are omitted.

The second embodiment illustrates an example in which, when a parking spot is detected by the search process, the parking process is started after the run-up process. However, the run-up process may be omitted. In this case, the steering angle pattern and speed pattern of the guide route are calculated so that the process seamlessly shifts from the search process to the parking process (without the subject vehicle stopping).

The configurations of the park assist device illustrated in the above embodiments are illustrative only, and configurations other than the illustrated configurations can be used as long as the functions are the same. For example, in the above embodiments, the braking mechanism 43 is a friction braking mechanism using hydraulic pressure. However, the braking mechanism 43 may be, for example, a friction braking mechanism using electromagnetic force or a regenerative braking mechanism using regeneration of an electric motor. As described above, the technique according to the present disclosure can be modified without departing from the spirit and scope of the present disclosure.

The technique according to the present disclosure is applicable to techniques that conform to the standards ISO 20900 (partially automated parking systems (PAPS)) and ISO 16787 (assisted parking systems (APS)).

What is claimed is:

1. A park assist device comprising:
a surroundings information sensor configured to acquire information on an object and an indication that are present around a subject vehicle; and
an electronic control unit configured to:
when a request to start automatic parking control is detected while the subject vehicle is traveling, perform a search process for searching for a parking spot based on the information acquired by the surroundings information sensor, the automatic parking control being control for parking the subject vehicle in the parking spot,
when the parking spot is detected, automatically stop the subject vehicle at a predetermined position ahead of the parking spot, and, while the subject vehicle is automatically stopped, perform a reception process for receiving a choice as to whether to park the subject vehicle in the detected parking spot, and
when a choice to park the subject vehicle in the detected parking spot is received, perform a parking process of the automatic parking control that includes controlling a drive actuator to drive the subject vehicle in such a manner that the subject vehicle is parked in the detected parking spot.

2. The park assist device according to claim 1, wherein the electronic control unit is configured to cause the subject vehicle to autonomously drive at a preset speed during the search process.

3. The park assist device according to claim 2, wherein the electronic control unit is configured to resume the search process when a choice not to park the subject vehicle in the detected parking spot is received.

4. The park assist device according to claim 3, wherein the electronic control unit is configured to
when the parking spot is detected by the search process, control the subject vehicle in such a manner that the subject vehicle stops at the predetermined position within an area around the detected parking spot.

5. The park assist device according to claim 2, wherein the electronic control unit is configured to end the search process when a preset amount of time has elapsed since start of the search process without detection of the parking spot, or when the subject vehicle has traveled a preset distance since the start of the search process without detection of the parking spot.

6. The park assist device according to claim 1, further comprising an input device configured to input the choice as to whether to park the subject vehicle in the parking spot detected by the search process, wherein the electronic control unit is configured to receive the choice input from the input device in the reception process.

7. A park assist method comprising:
acquiring information on an object and an indication that are present around a subject vehicle;
when a request to start automatic parking control is detected while the subject vehicle is traveling, searching for a parking spot based on the acquired information, the automatic parking control being control for parking the subject vehicle in the parking spot;
when the parking spot is detected, automatically stopping the subject vehicle at a predetermined position ahead of the parking spot, and, while the subject vehicle is automatically stopped, receiving a choice as to whether to park the subject vehicle in the detected parking spot; and
when a choice to park the subject vehicle in the detected parking spot is received, performing a parking process of the automatic parking control that includes controlling a drive actuator to drive the subject vehicle in such a manner that the subject vehicle is parked in the detected parking spot.

8. A non-transitory storage medium storing instructions that are executable by one or more processors and that cause the one or more processors to perform functions comprising:
acquiring information on an object and an indication that are present around a subject vehicle;
when a request to start automatic parking control is detected while the subject vehicle is traveling, searching for a parking spot based on the acquired information, the automatic parking control being control for parking the subject vehicle in the parking spot;

when the parking spot is detected, automatically stopping the subject vehicle at a predetermined position ahead of the parking spot, and, while the subject vehicle is automatically stopped, receiving a choice as to whether to park the subject vehicle in the detected parking spot; and when a choice to park the subject vehicle in the detected parking spot is received, performing a parking process of the automatic parking control that includes controlling a drive actuator to drive the subject vehicle in such a manner that the subject vehicle is parked in the detected parking spot.

\* \* \* \* \*